US012734817B2

(12) United States Patent
Yoshida

(10) Patent No.: US 12,734,817 B2
(45) Date of Patent: Sep. 15, 2026

(54) LIQUID EJECTION APPARATUS AND LIQUID STORAGE DEVICE

(71) Applicant: SEIKO EPSON CORPORATION, Tokyo (JP)

(72) Inventor: Masahiko Yoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 18/978,019

(22) Filed: Dec. 12, 2024

(65) Prior Publication Data

US 2025/0196506 A1 Jun. 19, 2025

(30) Foreign Application Priority Data

Dec. 14, 2023 (JP) ................................ 2023-211048

(51) Int. Cl.
*B41J 2/175* (2006.01)

(52) U.S. Cl.
CPC ....... *B41J 2/17566* (2013.01); *B41J 2/17506* (2013.01); *B41J 2002/17579* (2013.01)

(58) Field of Classification Search
CPC .......... B41J 2/17506; B41J 2002/17579; B41J 2/17566; B41J 2/195
See application file for complete search history.

(56) References Cited

U.S. PATENT DOCUMENTS

2012/0075379 A1* 3/2012 Murase ...................... B41J 2/18 347/20
2025/0001763 A1* 1/2025 Hayashi .................. B41J 29/38

FOREIGN PATENT DOCUMENTS

JP H06-270410 A 9/1994

* cited by examiner

*Primary Examiner* — Kristal Feggins
(74) *Attorney, Agent, or Firm* — Spencer Fane LLP

(57) ABSTRACT

A liquid ejection apparatus includes a storage container configured to store a liquid, a reference electrode, a first electrode, a second electrode, an output unit configured to output an output signal corresponding to electric signals from the first electrode and the second electrode, and an identification unit configured to identify a remaining amount of the liquid, wherein the first electrode has contact with the liquid stored, the second electrode has contact with the liquid stored, the reference electrode has contact with the liquid stored, and a resistance value of a first wiring path from the first electrode to the output unit is higher than a resistance value of a second wiring path from the second electrode to the output unit.

12 Claims, 16 Drawing Sheets

< H1 ≤ SZ < H2 >

< H2 ≤ SZ >

LIQUID EJECTION APPARATUS AND LIQUID STORAGE DEVICE

The present application is based on, and claims priority from JP Application Serial Number 2023-211048, filed Dec. 14, 2023, the disclosure of which is hereby incorporated by reference herein in its entirety.

BACKGROUND

1. Technical Field

The present disclosure relates to a liquid ejection apparatus and a liquid storage device.

2. Related Art

Various techniques for detecting a remaining amount of liquid in a storage container which contains a conductive liquid such as ink have been proposed. For example, JP-A-6-270410 proposes a technique of detecting a remaining amount of liquid in a storage container storing the liquid based on a resistance value between two rod-shaped electrode pins disposed in the storage container.

JP-A-6-270410 is an example of the related art.

However, in the related art, since an amount of change in the resistance value between the two electrode pins is minute compared to an amount of change in the remaining amount of the liquid in the storage container, it is difficult to detect the remaining amount of the liquid in the storage container in some cases.

SUMMARY

In order to solve the problem described above, a liquid ejection apparatus according to the present disclosure includes a storage container configured to store a liquid having conductivity, a reference electrode housed in the storage container, a first electrode housed in the storage container, a second electrode housed in the storage container, an output unit which is electrically coupled to the first electrode and the second electrode, and is configured to output an output signal corresponding to electric signals from the first electrode and the second electrode, and an identification unit configured to identify a remaining amount of the liquid stored in the storage container based on the output signal, wherein the first electrode has contact with the liquid stored in the storage container when the liquid equal to or more than a first amount is stored in the storage container, the second electrode has contact with the liquid stored in the storage container when the liquid equal to or more than a second amount larger than the first amount is stored in the storage container, the reference electrode has contact with the liquid stored in the storage container when the liquid equal to the first amount is stored in the storage container, and a resistance value of a first wiring path from the first electrode to the output unit is higher than a resistance value of a second wiring path from the second electrode to the output unit.

Further, a liquid storage device according to the present disclosure includes a storage container configured to store a liquid having conductivity, a reference electrode housed in the storage container, a first electrode housed in the storage container, a second electrode housed in the storage container, and an output unit which is electrically coupled to the first electrode and the second electrode, and is configured to output an output signal corresponding to electric signals from the first electrode and the second electrode, wherein the first electrode has contact with the liquid stored in the storage container when the liquid equal to or more than a first amount is stored in the storage container, the second electrode has contact with the liquid stored in the storage container when the liquid equal to or more than a second amount larger than the first amount is stored in the storage container, the reference electrode has contact with the liquid stored in the storage container when the liquid equal to the first amount is stored in the storage container, and a resistance value of a first wiring path from the first electrode to the output unit is higher than a resistance value of a second wiring path from the second electrode to the output unit.

DESCRIPTION OF EMBODIMENTS

Figure 1:
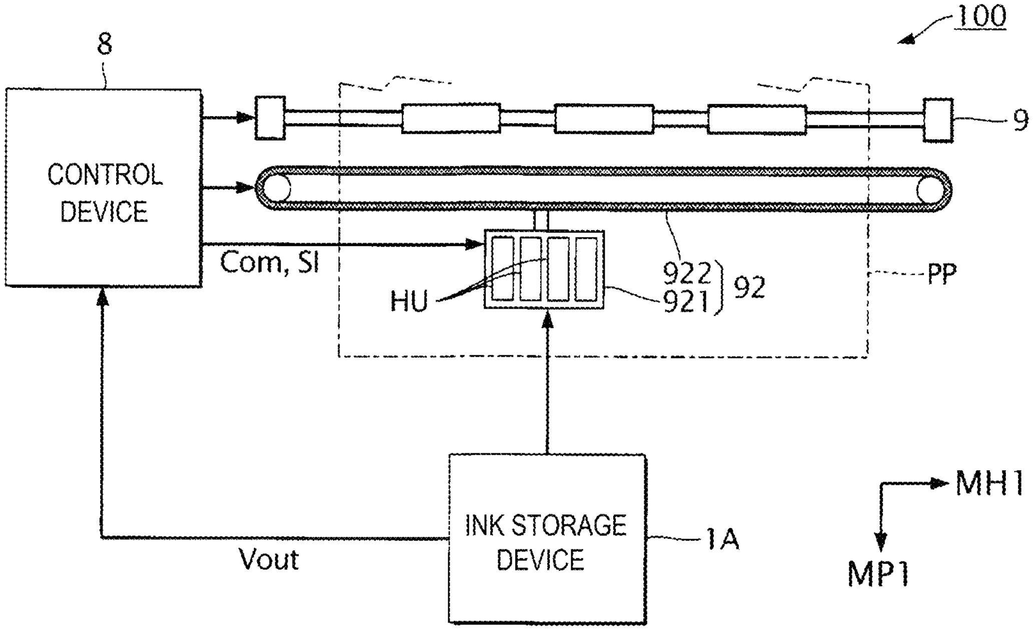
FIG. 1 is a configuration diagram showing an example of an inkjet printer 100 according to a first embodiment of the present disclosure.

An aspect for implementing the present disclosure will hereinafter be described with reference to the drawings. However, in the drawings, dimensions and scales of the elements are made different from actual ones as appropriate. Further, the following embodiment is a preferable specific example of the present disclosure and therefore various technically preferable limitations are imposed thereon, however, the scope of the present disclosure is not limited to the embodiment unless there is a description that the present disclosure is limited thereto in particular in the following description.

1. First Embodiment

An inkjet printer 100 according to a first embodiment will hereinafter be described.

1.1. Overview of Inkjet Printer

FIG. 1 is a diagram illustrating an example of a configuration of the inkjet printer 100 according to the present embodiment.

The inkjet printer 100 is an inkjet type printing apparatus that ejects ink IK onto a medium PP. The medium PP is typically printing paper, but any printing object, such as a resin film or fabric, may be used as the medium PP. In the present embodiment, conductive ink is adopted as the ink IK.

In the present embodiment, the inkjet printer 100 is an example of a "liquid ejection apparatus" and the ink IK is an example of a "conductive liquid".

As illustrated in FIG. 1, the inkjet printer 100 includes an ink storage device 1A, a control device 8, a plurality of liquid ejection heads HU, a conveyance mechanism 91, and a movement mechanism 92.

The control device 8 includes a processing circuit such as a CPU or an FPGA, and a storage circuit such as a semiconductor memory, and controls each element of the inkjet printer 100. Here, the CPU is an abbreviation for a central processing unit, and the FPGA is an abbreviation for a field programmable gate array.

The conveyance mechanism 91 conveys the medium PP in a sub-scanning direction MP1 under the control of the control device 8.

The movement mechanism 92 reciprocates the plurality of liquid ejection heads HU in a main scanning direction MH1 crossing the sub-scanning direction MP1 and a main scanning direction MH2 opposite to the main scanning direction MH1 based on the control by the control device 8. The movement mechanism 92 includes a housing case 921 that houses the plurality of liquid ejection heads HU, and an endless belt 922 to which the housing case 921 is fixed. The housing case 921 may house the ink storage device 1A together with the liquid ejection heads HU.

The control 8 supplies the liquid device ejection head HU with a drive signal Com for driving the liquid ejection head HU and a control signal SI for controlling the liquid ejection head HU.

The liquid ejection head HU is driven by the drive signal Com based on the control by the control signal SI, and ejects the ink IK from some or all of the plurality of nozzles provided to the liquid ejection head HU. That is, the liquid ejection head HU ejects the ink IK from some or all of the plurality of nozzles in conjunction with the conveyance of the medium PP by the conveyance mechanism 91 and the reciprocation of the liquid ejection head HU by the movement mechanism 92, to cause the ink thus ejected to land on the surface of the medium PP to thereby form a desired image on the surface of the medium PP.

The ink storage device 1A stores the ink IK. Further, the ink storage device 1A supplies the ink IK stored in the ink storage device 1A to the liquid ejection head HU based on the control by the control device 8.

Note that in the present embodiment, the ink storage device 1A is an example of a "liquid storage device".

In the present embodiment, it is assumed when the ink storage device 1A stores M types of ink IK. Here, a value M is a natural number that satisfies 15M. More specifically, in the present embodiment, as an example, it is assumed when the ink storage device 1A stores four types of ink IK corresponding to cyan, magenta, yellow, and black. That is, in the present embodiment, when "M=4" is true is assumed as an example.

In the present embodiment, it is assumed when the inkjet printer 100 includes M liquid ejection heads HU corresponding to M types of ink IK. Specifically, in the present embodiment, as an example, it is assumed when the inkjet printer 100 includes four liquid ejection heads HU corresponding to the four types of ink IK.

Note that in the following description, an m-th liquid ejection head HU out of the M liquid ejection heads HU may be referred to as a liquid ejection head HU[m] in some cases. Here, a variable m is a natural number satisfying $1 \leq m \leq M$.

The ink storage device 1A includes an ink amount detection circuit 2A that detects the remaining amount of each type of ink IK stored in the ink storage device 1A and outputs an output signal Vout representing the detection result. The ink amount detection circuit 2A will be described later with reference to FIG. 3.

1.2. Ink Storage Device

An outline of the ink storage device 1A will hereinafter be described with reference to FIG. 2 to FIG. 7.

Figure 2:
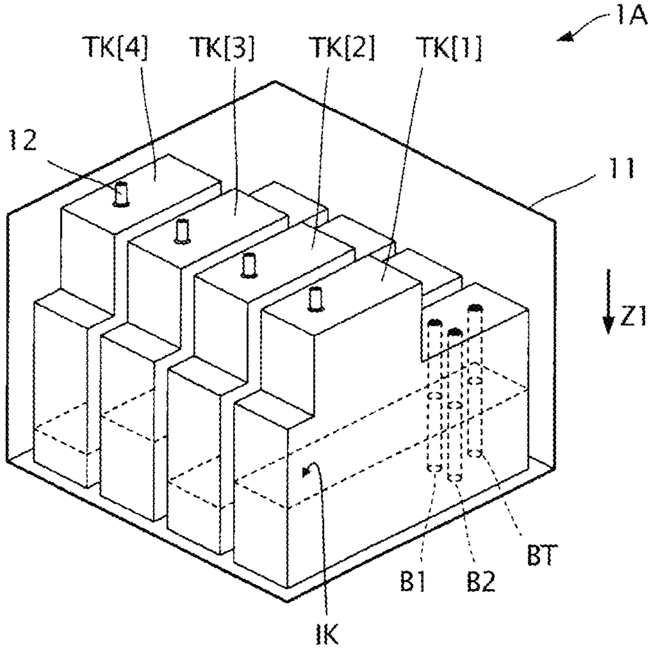
FIG. 2 is a perspective view showing an example of a configuration of an ink storage device 1A.

FIG. 2 is a perspective view illustrating an example of the configuration of the ink storage device 1A.

As illustrated in FIG. 2, the ink storage device 1A includes M ink tanks TK corresponding one-to-one to the M types of ink IK stored in the ink storage device 1A, and a storage case 11 for storing the M ink tanks TK. Specifically, in the present embodiment, the ink storage device 1A includes the four ink tanks TK corresponding one-to-one to the four types of ink IK of cyan, magenta, yellow, and black.

In the present embodiment, the ink tank TK is an example of a "storage container".

The m-th ink tank TK out of the M ink tanks TK may hereinafter be referred to as an ink tank TK[m] in some cases. The ink tank TK[m] stores the ink IK of a type corresponding to the ink tank TK[m], and supplies the ink IK to the liquid ejection head HU [m] corresponding to the ink tank TK[m].

In the present embodiment, the ink tank TK is provided with a supply port 12 for supplying the ink IK to an internal space of the ink tank TK. Further, the ink tank TK houses an electrode rod BT, an electrode rod B1, and an electrode rod B2 which are each a rod-shaped electrode.

Note that in the present embodiment, the electrode rod BT is an example of a "reference electrode", the electrode rod B1 is an example of a "first electrode", and the electrode rod B2 is an example of a "second electrode".

A direction in which the ink IK decreases in the ink tank TK when the ink IK is supplied from the ink tank TK to the liquid ejection head HU and the ink IK stored in the ink tank TK decreases will hereinafter be referred to as a Z1 direction. Further, in the present embodiment, as an example, it is assumed when the electrode rod BT, the electrode rod B1, and the electrode rod B2 are disposed in the ink tank TK so as to extend in the Z1 direction. Note that in the following description, the Z1 direction and the Z2 direction opposite to the Z1 direction are collectively referred to as the Z-axis direction.

Figure 3:
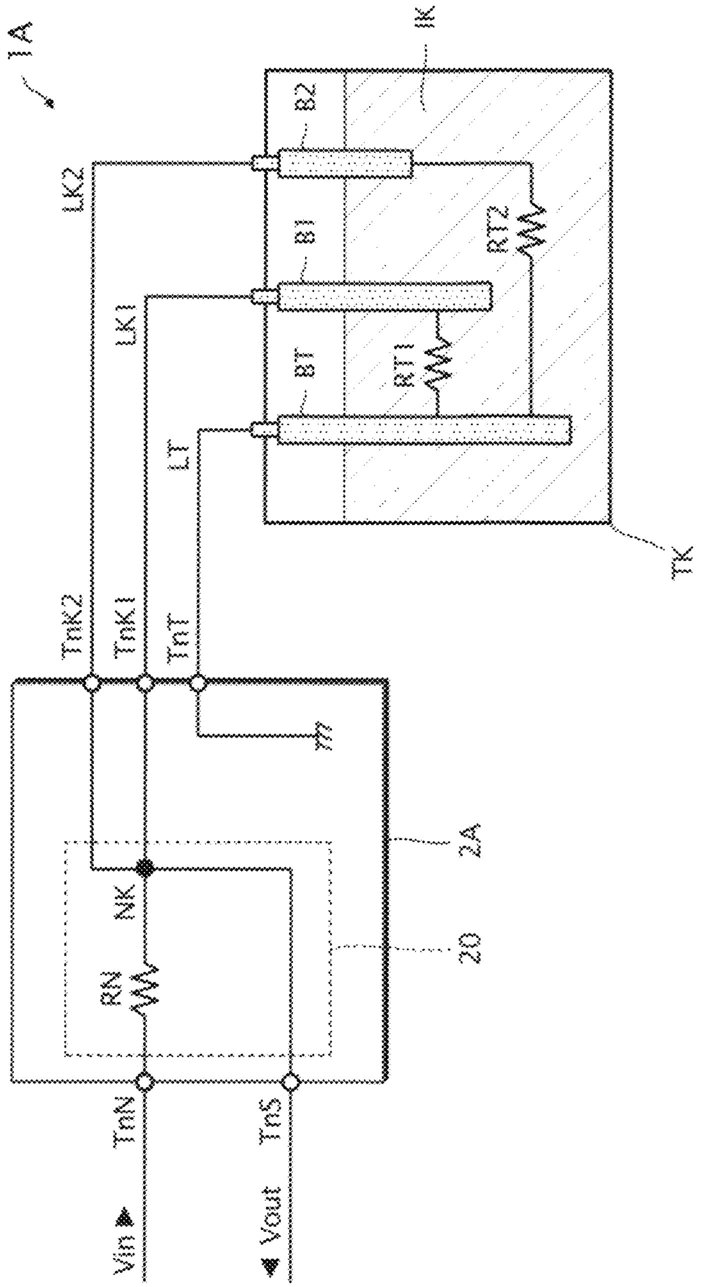
FIG. 3 is a circuit diagram showing an example of a configuration of the ink storage device 1A.

FIG. 3 is a circuit diagram showing an example of a configuration of the ink amount detection circuit 2A provided to the ink storage device 1A. Note that in the present embodiment, it is assumed when the M ink amount detection circuits 2A corresponding one-to-one to the M ink tanks TK[1] to TK[M] are provided to the ink storage device 1A.

As shown in FIG. 3, the ink amount detection circuit 2A includes an output circuit 20, an input terminal TnN, a detection terminal TnK1, a detection terminal TnK2, a reference potential coupling terminal TnT, and an output terminal TnS.

The output circuit 20 includes a node NK and an input resistor RN disposed between the input terminal TnN and the node NK.

Note that in the present embodiment, the output circuit 20 is an example of an "output unit".

The node NK is electrically coupled to the input terminal TnN, the detection terminal Ink1, the detection terminal TnK2, and the output terminal TnS. The detection terminal TnK1 is electrically coupled to the electrode rod B1 via detection wiring LK1. The detection terminal TnK2 is electrically coupled to the electrode rod B2 via detection wiring LK2. The reference potential coupling terminal TnT is electrically coupled to ground wiring set to the ground potential, and is electrically coupled to the electrode rod BT via reference potential coupling wiring LT.

In the present embodiment, when the ink IK is stored in the ink tank TK and the electrode rod BT and the electrode rod B1 are in contact with the ink IK stored in the ink tank TK, the electrode rod BT and the electrode rod B1 are electrically coupled to each other via the ink IK stored in the ink tank TK. In the following description, the electrical resistance of the ink IK that electrically couples the electrode rod BT and the electrode rod B1 to each other when the electrode rod BT and the electrode rod B1 are electrically coupled to each other via the ink IK stored in the ink tank TK, is referred to as an ink resistance RT1.

Further, in the present embodiment, when the ink IK is stored in the ink tank TK and the electrode rod BT and the electrode rod B2 are in contact with the ink IK stored in the ink tank TK, the electrode rod BT and the electrode rod B2 are electrically coupled to each other via the ink IK stored in the ink tank TK. In the following description, the electrical resistance of the ink IK that electrically couples the electrode rod BT and the electrode rod B2 to each other when the electrode rod BT and the electrode rod B2 are electrically coupled to each other via the ink IK stored in the ink tank TK, is referred to as an ink resistance RT2.

In the present embodiment, an input signal Vin set to a constant input potential VN is input to the input terminal TnN. Therefore, when the electrode rod BT and the electrode rod B1 are electrically coupled to each other via the ink IK stored in the ink tank TK, the potential of the node NK is determined based on the input potential VN of the input signal Vin, the resistance value of the input resistor RN, and the resistance value of the ink resistance RT1. Further, when the electrode rod BT and the electrode rod B2 are electrically coupled to each other via the ink IK stored in the ink tank TK, the potential of the node NK is determined based on the input potential VN of the input signal Vin, the resistance value of the input resistor RN, and the resistance value of the ink resistance RT2. In the present embodiment, since the input potential VN provided to the input signal Vin and the resistance value of the input resistor RN are constant values, it results in that the potential of the node NK is determined based on the resistance values of the ink resistance RT1 and the ink resistance RT2. Then, an output signal Vout representing the potential of the node NK is output from the output terminal TnS.

In the present embodiment, the control device 8 identifies the remaining amount of the ink IK stored in the ink tank TK based on the output signal Vout output by the output circuit 20.

In the present embodiment, the control device 8 is an example of an "identification unit".

Figure 4:
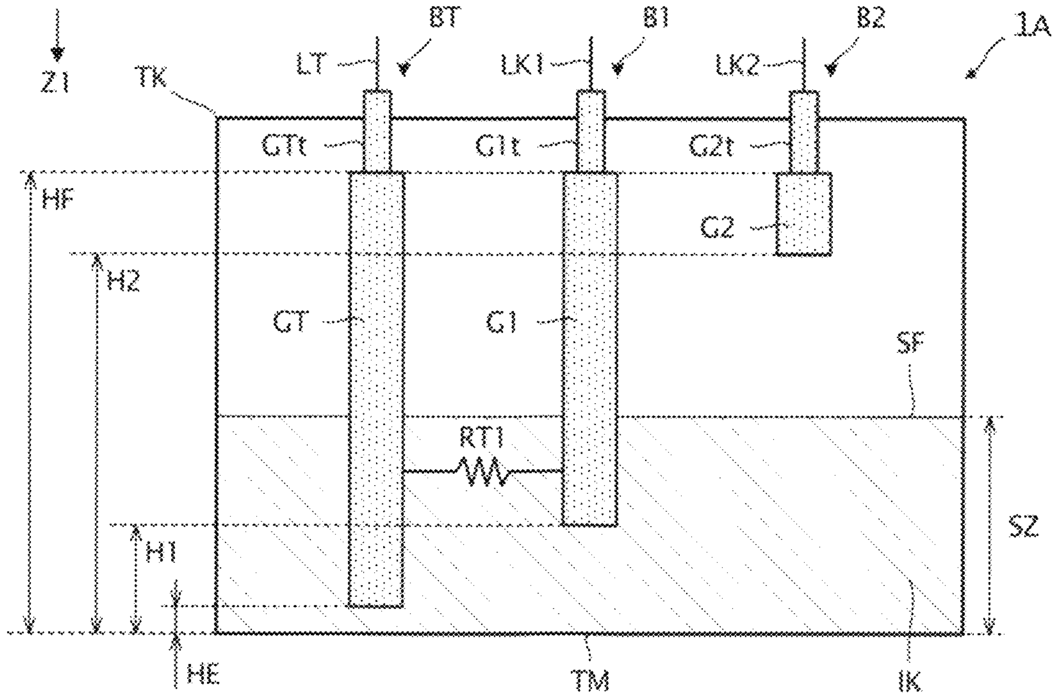
FIG. 4 is a diagram illustrating an example of a configuration of an ink tank TK.
Figure 5:
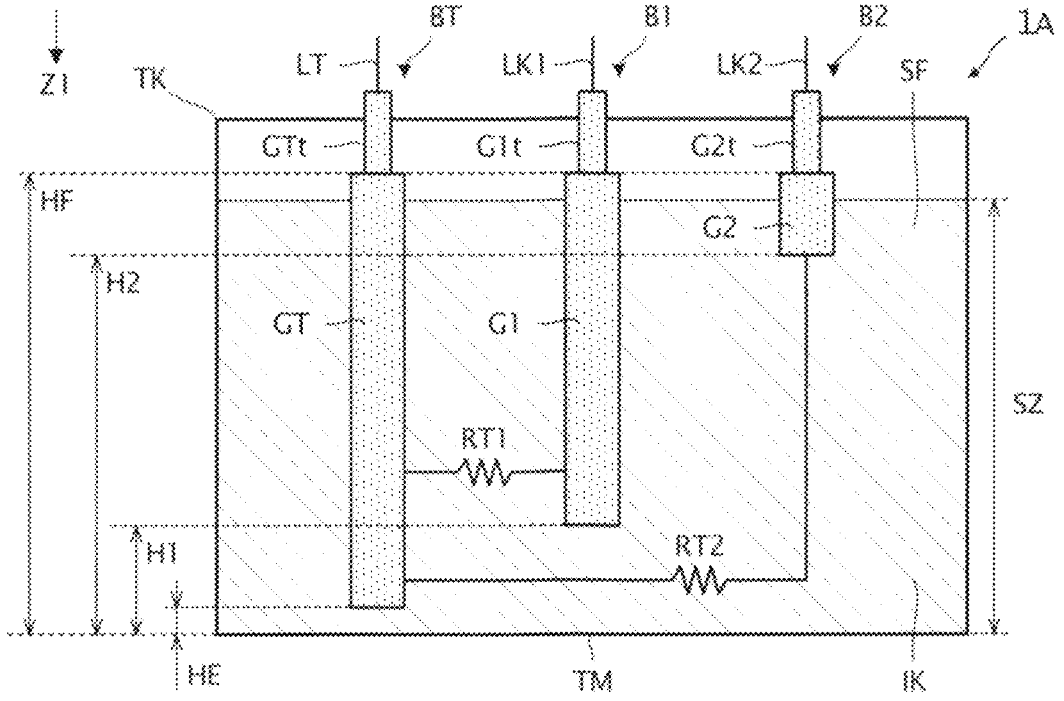
FIG. 5 is a diagram illustrating an example of a configuration of the ink tank TK.

FIG. 4 and FIG. 5 are configuration diagrams showing an example of the configuration of the electrode rod BT, the electrode rod B1, and the electrode rod B2.

As shown in FIG. 4 and FIG. 5, the electrode rod has BT an electrode forming portion GT which has conductivity and extends in the Z1 direction, and a coupling portion GTt which has conductivity, extends in the Z1 direction, and electrically couples the electrode forming portion GT and the reference potential coupling wiring LT to each other. In the present embodiment, it is assumed when the electrode forming portion GT is disposed such that a distance in the Z-axis direction from an end portion in the Z1 direction of the electrode rod BT to a bottom surface TM of the ink tank TK becomes a distance HE.

Further, the electrode rod BT has an electrode forming portion G1 which has conductivity and extends in the Z1 direction, and a coupling portion Glt which has conductivity, extends in the Z1 direction, and electrically couples the electrode forming portion G1 and the detection wiring LK1 to each other. In the present embodiment, it is assumed when the electrode forming portion G1 is disposed such that a distance in the Z-axis direction from an end portion in the Z1 direction of the electrode rod B1 to the bottom surface TM of the ink tank TK becomes a distance H1. Here, the distance H1 is a distance longer than the distance HE.

Further, the electrode rod B2 has an electrode forming portion G2 which has conductivity and extends in the Z1 direction, and a coupling portion G2*t* which has conductivity, extends in the Z1 direction, and electrically couples the electrode forming portion G2 and the detection wiring LK2 to each other. In the present embodiment, it is assumed when the electrode forming portion G2 is disposed such that a distance in the Z-axis direction from an end portion in the Z1 direction of the electrode rod B2 to the bottom surface TM of the ink tank TK becomes a distance H2. Here, the distance H2 is a distance longer than the distance H1.

Note that in the present embodiment, as an example, it is assumed that the electrode forming portion GT, the electrode forming portion G1, and the electrode forming portion G2 are disposed such that a distance in the Z-axis direction from an end portion in the Z2 direction of the electrode forming portion GT to the bottom surface TM of the ink tank TK, a distance in the Z-axis direction from an end portion in the Z2 direction of the electrode forming portion G1 to the bottom surface TM of the ink tank TK, and a distance in the Z-axis direction from an end portion in the Z2 direction of the electrode forming portion G2 to the bottom surface TM of the ink tank TK become a distance HF. Here, the distance HF is a distance longer than the distance H2.

A distance in the Z-axis direction from the bottom surface TM of the ink tank TK to a liquid surface SF of the ink IK stored in the ink tank TK is hereinafter referred to as an ink liquid surface distance SZ.

As shown in FIG. 4, when the ink IK is present between the electrode rod BT and the electrode rod B1, that is, when the ink liquid surface distance SZ is equal to or greater than the distance H1, the electrode rod BT and the electrode rod B1 are electrically coupled to each other with the ink IK. Therefore, when the ink liquid surface distance SZ is equal to or greater than the distance H1, the electrode rod BT and the electrode rod B1 are electrically coupled to each other with the ink IK having the ink resistance RT1.

Note that in the present embodiment, an amount of ink in the ink tank TK which makes the ink liquid surface distance SZ become the distance H1 is an example of a "first amount".

As shown in FIG. 5, when the ink IK is present between the electrode rod BT and the electrode rod B2, that is, when the ink liquid surface distance SZ is equal to or greater than the distance H2, the electrode rod BT and the electrode rod B2 are electrically coupled to each other with the ink IK. Therefore, when the ink liquid surface distance SZ is equal to or greater than the distance H2, the electrode rod BT and the electrode rod B2 are electrically coupled to each other with the ink IK having the ink resistance RT2.

Note that in the present embodiment, an amount of ink in the ink tank TK which makes the ink liquid surface distance SZ become the distance H2 is an example of a "second amount".

Note that in the following description, an electrical resistance in the electrical coupling path from the electrode rod BT to the node NK is referred to as a combined resistance RG. When the electrical resistances of the detection wiring LK1, the detection wiring LK2, the electrode rod B1, and the electrode rod B2 are sufficiently small, it results in that the combined resistance RG has substantially the same resistance value as the combined resistance of the ink resistance RT1 and the ink resistance RT2.

Note that in the present specification, "substantially the same" is a concept including when two things can be assumed to be the same considering the tolerance in addition to when they are completely the same. Specifically, in the present specification, it is assumed that "substantially the same" is a concept including when two things can be assumed to be the same considering the tolerance of about 10%.

Figure 6:
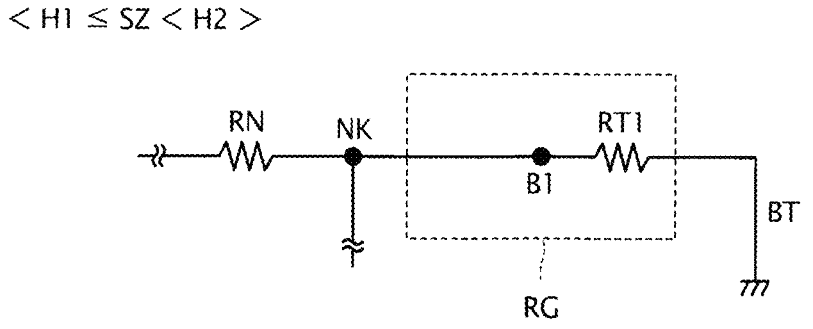
FIG. 6 is a circuit diagram showing an example of a combined resistance RG.
Figure 7:
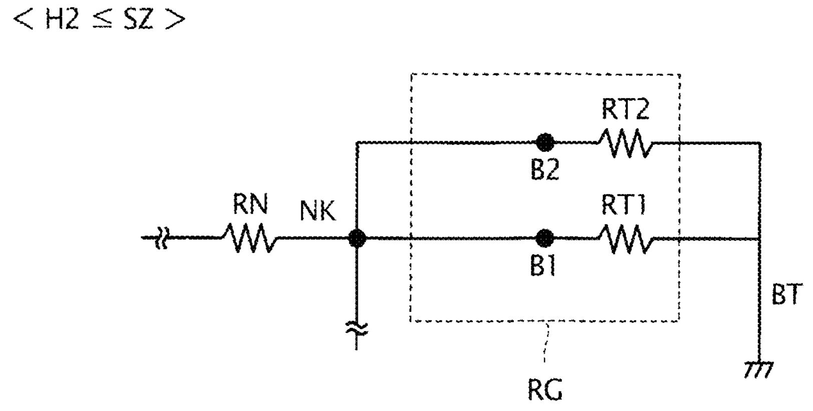
FIG. 7 is a circuit diagram showing an example of the combined resistance RG.

FIG. 6 and FIG. 7 are circuit diagrams illustrating the combined resistance RG. Out of these, FIG. 6 is a diagram showing the combined resistance RG obtained when the ink liquid surface distance SZ is equal to or greater than the distance H1 and less than the distance H2. Further, FIG. 7 is a diagram showing the combined resistance RG obtained when the ink liquid surface distance SZ is equal to or greater than the distance H2.

As shown in FIG. 6, when the ink liquid surface distance SZ is equal to or greater than the distance H1 and less than the distance H2, the electrode rod BT and the electrode rod B1 are electrically coupled to each other with the ink IK, while the electrode rod BT and the electrode rod B2 are not electrically coupled to each other. Therefore, when the ink liquid surface distance SZ is equal to or greater than the distance H1 and less than the distance H2, the combined resistance RG becomes substantially the same as the ink resistance RT1.

As shown in FIG. 7, when the ink liquid surface distance SZ is equal to or greater than the distance H2, the electrode rod BT and the electrode rod B1 are electrically coupled to each other with the ink IK, and the electrode rod BT and the electrode rod B2 are electrically coupled to each other with the ink IK. Therefore, when the ink liquid surface distance SZ is equal to or greater than the distance H2, the combined resistance RG becomes substantially the same as the combined resistance of the ink resistance RT1 and the ink resistance RT2 when the ink resistance RT1 and the ink resistance RT2 are coupled in parallel to each other.

Note that in the present embodiment, as an example, it is assumed when the resistance value of a first wiring path from the electrode rod B1 to the node NK via the detection wiring LK1 and the detection terminal TnK1 is substantially the same as the resistance value of a second wiring path from the electrode rod B2 to the node NK via the detection wiring LK2 and the detection terminal TnK2.

1.3. Reference Example

An outline of an inkjet printer according to a reference example, and advantages of the first embodiment will hereinafter be described with reference to FIG. 8 to FIG. 14. Note that the inkjet printer according to the reference example is different from the inkjet printer 100 according to the first embodiment in that an ink storage device 1W is provided instead of the ink storage device 1A.

Figure 8:
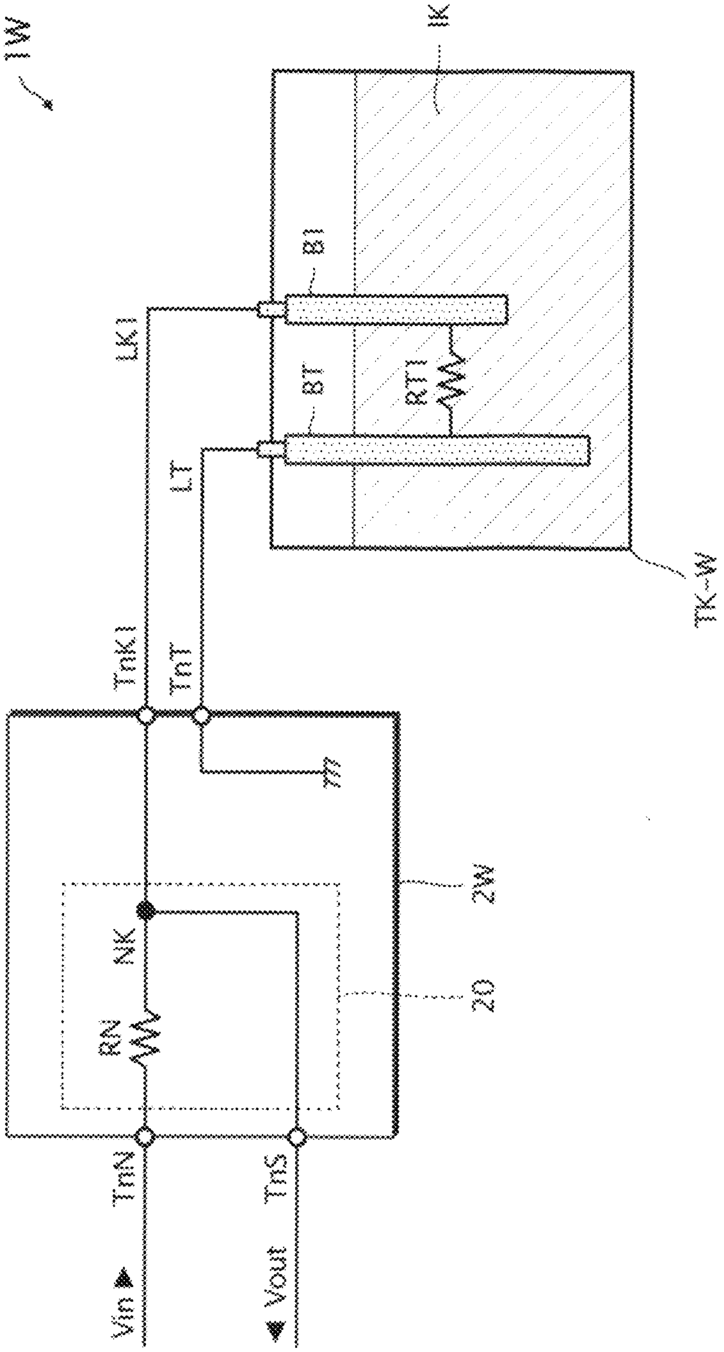
FIG. 8 is a circuit diagram illustrating an example of a configuration of an ink storage device 1W according to a reference example.

FIG. 8 is a circuit diagram illustrating a configuration of the ink storage device 1W.

As shown in FIG. 8, the ink storage device 1W is different from the ink storage device 1A according to the first embodiment in that an ink tank TK-W is provided instead of the ink tank TK and an ink amount detection circuit 2W is provided instead of the ink amount detection circuit 2A.

The ink tank TK-W is different from the ink tank TK related to the first embodiment in that it does not include the electrode rod B2. That is, the electrode rod BT and the electrode rod B1 are housed in the ink tank TK-W.

The ink amount detection circuit 2W is different from the ink amount detection circuit 2A related to the first embodiment in that it does not include the detection terminal TnK2. That is, the ink amount detection circuit 2W includes the detection terminal TnK1 electrically coupled to the electrode rod B1 via the detection wiring LK1, and the reference potential coupling terminal TnT electrically coupled to the electrode rod BT via the reference potential coupling wiring LT.

Note that in the inkjet printer according to the reference example, the combined resistance RG, which is the electrical resistance in the electrical coupling path from the electrode rod BT to the node NK, is substantially the same as the ink resistance RT1.

In the following description, when distinction is required, the combined resistance RG in the first embodiment may be referred to as a combined resistance RG-A, and the combined resistance RG in the reference example may be referred to as a combined resistance RG-W in some cases.

Figure 9:
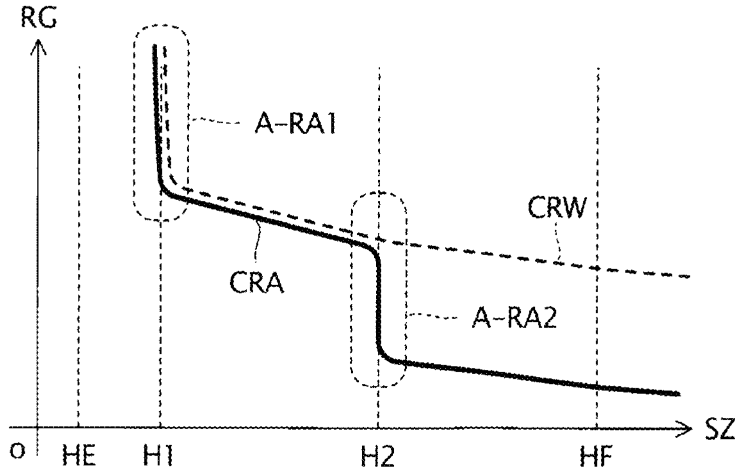
FIG. 9 is a diagram illustrating an example of a relationship between an ink liquid surface distance SZ and the combined resistance RG.

1.4. Relationship Between Ink Liquid Surface Distance, and Combined Resistance and Output Signal FIG. 9 is a diagram illustrating a resistance value change curve CRA related to the first embodiment and a resistance value change curve CRW related to the reference example. Here, the resistance value change curve CRA is a curve representing a relationship between a resistance value of the combined resistance RG-A and the ink liquid surface distance SZ in the first embodiment. Further, the resistance value change curve CRW is a curve representing a relationship between a resistance value of the combined resistance RG-W and the ink liquid surface distance SZ in the reference example. Note that in FIG. 9, the relationship between the ink liquid surface distance SZ and the resistance value of the combined resistance RG is expressed as the resistance value change curve CRA and the resistance value change curve CRW by setting the horizontal axis as the ink liquid surface distance SZ and the vertical axis as the resistance value of the combined resistance RG.

As described above, when the ink liquid surface distance SZ is less than the distance H1, the electrode rod B1 and the electrode rod B2 do not have contact with the ink IK. That is, when the ink liquid surface distance SZ is less than the distance H1, the electrode rod BT and the electrode rod B1 become in the state of not being electrically coupled to each other, and the electrode rod BT and the electrode rod B2 also become in the state of not being electrically coupled to each other. On the other hand, when the ink liquid surface distance SZ is equal to or greater than the distance H1, the electrode rod B1 comes into contact with the ink IK. That is, when the ink liquid surface distance SZ is equal to or greater than the distance H1, the electrode rod BT and the electrode rod B1 become in the state of being electrically coupled to each other.

Therefore, as represented by the resistance value change curve CRA in FIG. 9, in the first embodiment, when the ink liquid surface distance SZ is equal to or greater than the distance H1, the combined resistance RG-A has a smaller resistance value compared to when the ink liquid surface distance SZ is less than the distance H1. That is, it results in that in the present embodiment, the resistance value change curve CRA has a change region A-RA1 in which the combined resistance RG-A significantly changes at a boundary between when the ink liquid surface distance SZ is less than the distance H1 and when the ink liquid surface distance SZ is equal to or greater than the distance H1.

Similarly, as represented by the resistance value change curve CRW in FIG. 9, also in the reference example, when the ink liquid surface distance SZ is equal to or greater than the distance H1, the combined resistance RG-W takes a smaller resistance value compared to when the ink liquid surface distance SZ is less than the distance H1. That is, in the present embodiment, it results in that the resistance value change curve CRW also has a change region A-RA1 in which the combined resistance RG-W significantly changes at a boundary between when the ink liquid surface distance SZ is less than the distance H1 and when the ink liquid surface distance SZ is equal to or greater than the distance H1 similarly to the resistance value change curve CRA.

Further, when the ink liquid surface distance SZ is equal to or greater than the distance H1 and less than the distance H2, the electrode rod B1 is in contact with the ink IK, while the electrode rod B2 is not in contact with the ink IK. That is, when the ink liquid surface distance SZ is equal to or greater than the distance H1 and less than the distance H2, the electrode rod BT and the electrode rod B1 are electrically coupled to each other with the ink IK having the ink resistance RT1. Then, as the ink liquid surface distance SZ increases and the cross-sectional area of the ink IK electrically coupling the electrode rod BT and the electrode rod B1 to each other increases, the resistance value of the ink resistance RT1 decreases.

Therefore, as represented by the resistance value change curve CRA in FIG. 9, in the first embodiment, when the ink liquid surface distance SZ is equal to or greater than the distance H1 and less than the distance H2, the resistance value of the combined resistance RG-A decreases as the ink liquid surface distance SZ elongates. Similarly, as represented by the resistance value change curve CRW in FIG. 9, in the reference example, when the ink liquid surface distance SZ is equal to or greater than the distance H1 and less than the distance H2, the resistance value of the combined resistance RG-W decreases as the ink liquid surface distance SZ elongates.

Further, when the ink liquid surface distance SZ is equal to or greater than the distance H2, the electrode rod B1 and the electrode rod B2 come into contact with the ink IK. That is, when the ink liquid surface distance SZ is equal to or greater than the distance H2, the electrode rod BT and the electrode rod B1 are electrically coupled to each other with the ink IK having the ink resistance RT1, and the electrode rod BT and the electrode rod B2 are electrically coupled to each other with the ink IK having the ink resistance RT2. Further, the resistance value of the combined resistance of the ink resistance RT1 and the ink resistance RT2 when the ink resistance RT1 and the ink resistance RT2 are coupled in parallel to each other is smaller than the resistance value of the ink resistance RT1 alone.

Therefore, as represented by the resistance value change curve CRA in FIG. 9, in the first embodiment, when the ink liquid surface distance SZ is equal to or greater than the distance H2, the combined resistance RG-A has a smaller resistance value compared to when the ink liquid surface distance SZ is less than the distance H2. That is, it results in that in the first embodiment, the resistance value change curve CRA has a change region A-RA2 in which the combined resistance RG-A significantly changes at a boundary between when the ink liquid surface distance SZ is less than the distance H2 and when the ink liquid surface distance SZ is equal to or greater than the distance H2.

On the other hand, in the reference example, the electrode rod B2 is not provided to the ink tank TK-W. That is, in the reference example, both the combined resistance RG-W when the ink liquid surface distance SZ is less than the distance H2 and the combined resistance RG-W when the ink liquid surface distance SZ is equal to or greater than the distance H2 become the ink resistance RT1. Therefore, as shown in FIG. 9, the resistance value change curve CRW related to the reference example does not have the change region A-RA2.

In addition, as the ink liquid surface distance SZ increases and the cross-sectional area of the ink IK electrically coupling the electrode rod BT and the electrode rod B1 to each other increases, the resistance value of the ink resistance RT1 decreases, and as the ink liquid surface distance SZ increases, and the cross-sectional area of the ink IK electrically coupling the electrode rod BT and the electrode rod B2 to each other increases, the resistance value of the ink resistance RT2 decreases.

Therefore, as represented by the resistance value change curve CRA in FIG. 9, in the first embodiment, when the ink liquid surface distance SZ is equal to or greater than the distance H2, the resistance value of the combined resistance RG-A decreases as the ink liquid surface distance SZ elongates. Similarly, as represented by the resistance value change curve CRW in FIG. 9, in the reference example, when the ink liquid surface distance SZ is equal to or greater than the distance H2, the resistance value of the combined resistance RG-W decreases as the ink liquid surface distance SZ elongates.

As described above, both the resistance value change curve CRA and the resistance value change curve CRW have the change region A-RA1. Therefore, the resistance value change curve CRA has substantially the same shape as the resistance value change curve CRW when the ink liquid surface distance SZ is less than the distance H2.

Further, the resistance value change curve CRA has the change region A-RA2, whereas the resistance value change curve CRW does not have the change region A-RA2, but has a smooth shape in which the combined resistance RG-W continuously decreases as the ink liquid surface distance SZ increases. Therefore, the resistance value change curve CRA represents a resistance value lower than the resistance value change curve CRW when the ink liquid surface distance SZ is equal to or greater than the distance H2.

Figure 10:
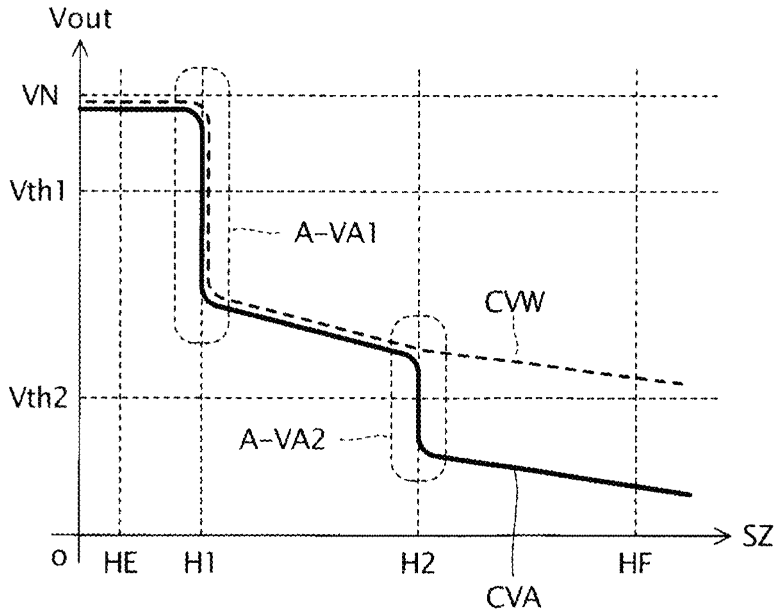
FIG. 10 is a diagram illustrating an example of a relationship between the ink liquid surface distance SZ and an output signal Vout.

FIG. 10 is a diagram illustrating a potential change curve CVA related to the first embodiment and a potential change curve CVW related to the reference example. Here, the potential change curve CVA means a curve representing a relationship between the output signal Vout output by the ink amount detection circuit 2A in the first embodiment and the ink liquid surface distance SZ. Further, the potential change curve CVW means a curve representing a relationship between the output signal Vout output by the ink amount detection circuit 2W in the reference example and the ink liquid surface distance SZ. Note that in FIG. 10, the relationship between the ink liquid surface distance SZ and the potential of the output signal Vout is expressed as the potential change curve CVA and the potential change curve CVW by setting the horizontal axis as the ink liquid surface distance SZ and the vertical axis as the potential of the output signal Vout.

Hereinafter, when distinction is required, the output signal Vout output by the ink amount detection circuit 2A in the first embodiment is referred to as an output signal Vout-A, and the output signal Vout output by the ink amount detection circuit 2W in the reference example is referred to as an output signal Vout-W in some cases.

As described above, the potential of the output signal Vout, that is, the potential of the node NK, is determined based on the resistance value of the combined resistance RG. Specifically, when the resistance value of the combined resistance RG is high, the potential of the output signal Vout also rises compared to when the resistance value is low.

Therefore, as represented by the potential change curve CVA in FIG. 10, in the first embodiment, when the ink liquid surface distance SZ is equal to or greater than the distance H1, the output signal Vout-A becomes lower in potential compared to when the ink liquid surface distance SZ is less than the distance H1. Further, as represented by the potential change curve CVA, when the ink liquid surface distance SZ is equal to or greater than the distance H2, the output signal Vout-A becomes lower in potential compared to when the ink liquid surface distance SZ is less than the distance H2. That is, as represented by the potential change curve CVA, the potential of the output signal Vout-A decreases as the ink liquid surface distance SZ increases.

Note that as described above, the resistance value change curve CRA includes the change region A-RA1 and the change region A-RA2. Therefore, as shown in FIG. 10, the potential change curve CVA also has a change region A-VA1 and a change region A-VA2 in which the rate of change of the potential of the output signal Vout-A increases with respect to the change in the ink liquid surface distance SZ. Here, the change region A-VAL is a region corresponding to the change region A-RA1, and is a region in which the potential of the output signal Vout-A significantly changes at the boundary between when the ink liquid surface distance SZ is less than the distance H1 and when the ink liquid surface distance SZ is equal to or greater than the distance H1. Further, the change region A-VA2 is a region corresponding to the change region A-RA2, and is a region in which the potential of the output signal Vout-A significantly changes at the boundary between when the ink liquid surface distance SZ is less than the distance H2 and when the ink liquid surface distance SZ is equal to or greater than the distance H2.

Further, as represented by the potential change curve CVW in FIG. 10, in the reference example, when the ink liquid surface distance SZ is equal to or greater than the distance H1, the output signal Vout-W becomes lower in potential compared to when the ink liquid surface distance SZ is less than the distance H1. Further, as represented by the potential change curve CVW, when the ink liquid surface distance SZ is equal to or greater than the distance H2, the output signal Vout-W becomes lower in potential compared to when the ink liquid surface distance SZ is less than the distance H2. That is, as represented by the potential change curve CVW, the potential of the output signal Vout-W decreases as the ink liquid surface distance SZ increases.

Note that as described above, the resistance value change curve CRW includes the change region A-RA1 on the one hand, but does not include the change region A-RA2 on the other hand. Therefore, as shown in FIG. 10, the potential change curve CVW also has the change region A-VA1 on the one hand, but does not have the change region A-VA2 on the other hand.

The potential represented by the output signal Vout-A in the first embodiment when the temperature of the ink IK in the ink tank TK is the reference temperature t1 and the ink liquid surface distance SZ in the ink tank TK is the distance H1, is hereinafter referred to as a threshold potential Vth1. Note that as shown in FIG. 10, a potential represented by the output signal Vout-W in the reference example when the temperature of the ink IK in the ink tank TK-W is the reference temperature t1 and the ink liquid surface distance SZ in the ink tank TK-W is the distance H1 also becomes the threshold potential Vth1.

Further, a potential represented by the output signal Vout-A in the first embodiment when the temperature of the ink IK in the ink tank TK is the reference temperature t1 and the ink liquid surface distance SZ in the ink tank TK is the distance H2, is hereinafter referred to as a threshold potential Vth2. Note that as shown in FIG. 10, a potential represented by the output signal Vout-W represented by the potential change curve CVW in the reference example when the temperature of the ink IK in the ink tank TK-W is the reference temperature t1 and the ink liquid surface distance SZ in the ink tank TK-W is the distance H2 becomes a potential higher than the threshold potential Vth2.

Here, the reference temperature t1 means, for example, the temperature of the ink IK in the ink tank TK when the inkjet printer 100 is used in a standard use environment of the inkjet printer 100. The reference temperature t1 may be, for example, an ambient temperature of the inkjet printer 100 when the inkjet printer 100 is used in the standard use environment of the inkjet printer 100. Further, the reference temperature t1 may be, for example, a temperature of a standard use environment of the ink IK.

As described above, in the first embodiment, the control device 8 identifies the remaining amount of the ink IK stored in the ink tank TK based on the output signal Vout-A.

Specifically, in the first embodiment, the control device 8 identifies that the remaining amount of the ink IK in the ink tank TK is less than an ink amount corresponding to the distance H1 when the potential of the output signal Vout-A is higher than the threshold potential Vth1, and identifies that the remaining amount of the ink IK in the ink tank TK is larger than the ink amount corresponding to the distance H1 when the potential of the output signal Vout-A is lower than the threshold potential Vth1.

Here, the ink corresponding to the distance H1 is an amount based on the minimum amount of the ink IK in the ink tank TK. Specifically, the amount based on the minimum amount of the ink IK in the ink tank TK may be a minimum amount of ink which is necessary for the liquid ejection head HU to eject the ink IK using the ink IK supplied from the ink tank TK, or may be an amount of ink the difference of which from the minimum amount of ink is equal to or less than a first difference amount. Here, the first difference amount may be, for example, an amount of ink equal to or less than an amount of ink necessary for the inkjet printer 100 to form an image on a predetermined number of sheets of the medium PP, or an amount of ink with which the ink IK can be ejected from the liquid ejection head HU a predetermined number of times or less. That is, the amount of ink corresponding to the distance H1 may be an amount of ink corresponding to a state called "ink end".

Note that in the present embodiment, the ink amount corresponding to the distance H1, namely a "first amount", h is an example of an "amount based on the minimum amount of liquid in the storage container".

Further, in the first embodiment, the control device 8 identifies that the remaining amount of the ink IK in the ink tank TK is less than an ink amount corresponding to the distance H2 when the potential of the output signal Vout-A is higher than the threshold potential Vth2, and identifies that the remaining amount of the ink IK in the ink tank TK is larger than the ink amount corresponding to the distance H2 when the potential of the output signal Vout-A is lower than the threshold potential Vth2.

Here, the ink amount corresponding to the distance H2 means an amount based on the maximum amount of the ink IK in the ink tank TK. Specifically, the amount based on the maximum amount of ink IK in the ink tank TK may be the maximum amount of ink that can be stored in the ink tank TK, or may be an amount of ink the difference of which from the maximum amount of ink is equal to or less than a second difference amount. Here, the second difference amount may be, for example, an amount of ink that can be supplied within a predetermined time when a user of the inkjet printer 100 supplies the ink IK from the bottle containing the ink IK to the inside of the ink tank TK via the supply port 12. Further, for example, the second difference amount may be a minimum amount of ink IK that can be supplied by the user of the inkjet printer 100 to the ink tank TK with the bottle in which the ink IK is stored. That is, the ink amount corresponding to the distance H2 may be an amount of ink corresponding to a state called "full".

Note that in the present embodiment, the ink amount corresponding to the distance H2, namely a "second amount", is an example of an "amount based on the maximum amount of liquid in the storage container".

In addition, in the reference example, similarly to the first embodiment, the control device 8 identifies that the remaining amount of the ink IK in the ink tank TK-W is less than the ink amount corresponding to the distance H1 when the potential of the output signal Vout-W is higher than the threshold potential Vth1, and identifies that the remaining amount of the ink IK in the ink tank TK-W is larger than the ink amount corresponding to the distance H1 when the potential of the output signal Vout-W is lower than the threshold potential Vth1.

On the other hand, in the reference example, unlike the first embodiment, the control device 8 cannot identify whether the remaining amount of the ink IK in the ink tank TK-W is less than the ink amount corresponding to the distance H2 based on the determination result of whether the potential of the output signal Vout-W is higher than the threshold potential Vth2.

Figure 11:
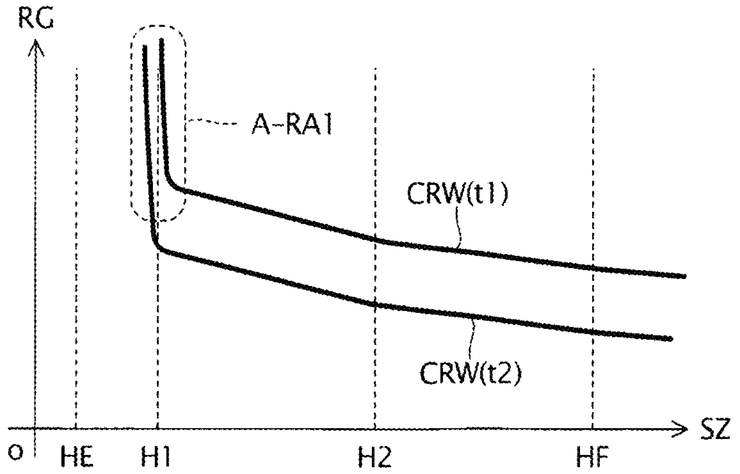
FIG. 11 is a diagram illustrating an example of a temperature change in a resistance value change curve CRW.

FIG. 11 is a diagram illustrating a temperature change of the resistance value change curve CRW with the temperature change of the ink IK in the ink tank TK-W related to the reference example.

Specifically, in FIG. 11, the resistance value change curve CRW when the temperature of the ink IK in the ink tank TK-W is the reference temperature t1 is expressed as a resistance value change curve CRW(t1), and the resistance value change curve CRW when the temperature of the ink IK in the ink tank TK is the temperature t2 different from the reference temperature t1 is expressed as a resistance value change curve CRW(t2).

As shown in FIG. 11, when the temperature of the ink IK in the ink tank TK-W changes, the resistance value represented by the resistance value change curve CRW also changes. Specifically, when the temperature of the ink IK in the ink tank TK-W changes from the reference temperature t1 to the temperature t2, the resistance value of the combined resistance RG-W represented by the resistance value change curve CRW also changes. That is, when the ink liquid surface distance SZ is the same value, the resistance value of the combined resistance RG-W represented by the resistance value change curve CRW(t1) is different from the resistance value of the combined resistance RG-W represented by the resistance value change curve CRW(t2).

Note that although FIG. 11 illustrates when the resistance value of the combined resistance RG-W represented by the resistance value change curve CRW changes to a smaller value with the temperature change of the ink IK in the ink tank TK-W, the present disclosure is not limited to such an aspect. The resistance value of the combined resistance RG-W represented by the resistance value change curve CRW may change to a larger value with the temperature change of the ink IK in the ink tank TK-W.

As described above, the resistance value change curve CRW related to the reference example has the change region A-RA1 in a portion where the ink liquid surface distance SZ becomes the distance H1. That is, in the change region A-RA1 including the portion where the ink liquid surface distance SZ becomes the distance H1 in the resistance value change curve CRW, the resistance value of the combined resistance RG-W represented by the resistance value change curve CRW significantly changes. Therefore, in the vertical axis direction of the graph shown in FIG. 11, a part of the change region A-RA1 provided to the resistance value change curve CRW(t1) overlaps a part of the change region A-RA1 provided to the resistance value change curve CRW (t2).

Figure 12:
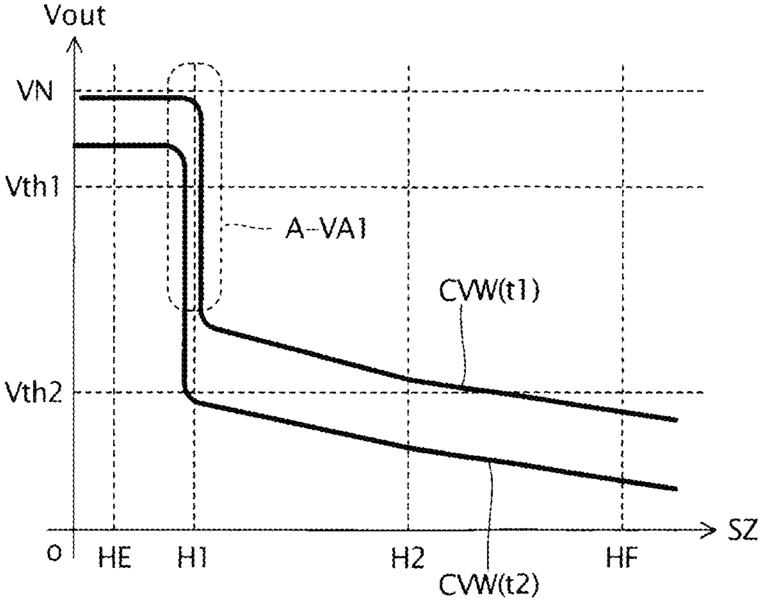
FIG. 12 is a diagram illustrating an example of a temperature change in a potential change curve CVW.

FIG. 12 is a diagram illustrating a temperature change of the potential change curve CVW with the temperature change of the ink IK in the ink tank TK-W related to the reference example.

Specifically, in FIG. 12, the potential change curve CVW when the temperature of the ink IK in the ink tank TK-W is the reference temperature t1 is expressed as the potential change curve CVW(t1), and the potential change curve CVW when the temperature of the ink IK in the ink tank TK-W is the temperature t2 is expressed as the potential change curve CVW(t2).

As shown in FIG. 12, when the temperature of the ink IK in the ink tank TK-W changes, the potential represented by the potential change curve CVW also changes. Specifically, when the temperature of the ink IK in the ink tank TK-W changes from the reference temperature t1 to the temperature t2, the potential of the output signal Vout-W represented by the potential change curve CVW also changes. That is, even when the ink liquid surface distance SZ is the same value, the potential of the output signal Vout-W represented by the potential change curve CVW(t1) is different from the potential of the output signal Vout-W represented by the potential change curve CVW(t2).

Note that although FIG. 12 illustrates when the potential of the output signal Vout-W represented by the potential change curve CVW changes to a smaller value with the temperature change of the ink IK in the ink tank TK-W, the present disclosure is not limited to such an aspect. The potential of the output signal Vout-W represented by the potential change curve CVW may change to a larger value with the temperature change of the ink IK in the ink tank TK-W.

As described above, in the ink storage device 1W according to the reference example, even when there is no change in the remaining amount of the ink IK in the ink tank TK-W, the potential of the output signal Vout-W output by the ink storage device 1W changes with the temperature change of the ink IK in the ink tank TK-W. Therefore, the ink storage device 1W according to the reference example cannot appropriately detect the remaining amount of the ink IK in some cases.

Specifically, in the example illustrated in FIG. 12, when the temperature of the ink IK in the ink tank TK-W is the reference temperature t1 and the potential of the output signal Vout-W is less than the threshold potential Vth2, the remaining amount of the ink IK in the ink tank TK-W is larger than the ink amount corresponding to the distance H2 in the ink storage device 1W. On the other hand, in the example shown in FIG. 12, when the temperature of the ink IK in the ink tank TK-W is the temperature t2 and the potential of the output signal Vout-W is less than the threshold potential Vth2, there is a possibility that the remaining amount of the ink IK in the ink tank TK-W becomes larger than the ink amount corresponding to the distance H1, besides the possibility that the remaining amount of the ink IK in the ink tank TK-W becomes larger than the ink amount corresponding to the distance H2 in the ink storage device 1W. That is, there is also a possibility that the remaining amount of the ink IK in the ink tank TK-W is actually less than the ink amount corresponding to the distance H2 even though the potential of the output signal Vout-W is less than the threshold potential Vth2 and the user of the inkjet printer recognizes that the remaining amount of the ink IK in the ink tank TK-W is larger than the ink amount corresponding to the distance H2.

That is, in the ink storage device 1W according to the reference example, there is a possibility that it becomes difficult to detect the remaining amount of the ink IK in the ink tank TK-W based on the output signal Vout-W.

Note that in the ink storage device 1W, it is conceivable to adopt an aspect in which a temperature detection device for detecting the temperature of the ink IK in the ink tank TK-W is added, and the potential represented by the output signal Vout-W is corrected in accordance with the detection result of the temperature detection device, and thus, the remaining amount of the ink IK in the ink tank TK-W is detected based on the potential represented by the output signal Vout-W thus corrected. However, case, there is a concern that the configuration of the ink storage device 1W becomes complicated compared to the first embodiment described above.

Figure 13:
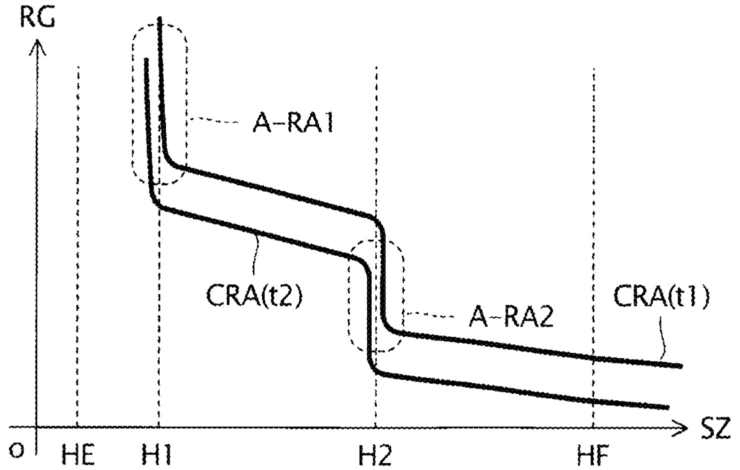
FIG. 13 is a diagram illustrating an example of a temperature change in a resistance value change curve CRA.

FIG. 13 is a diagram illustrating a temperature change of the resistance value change curve CRA with the temperature change of the ink IK in the ink tank TK related to the first embodiment.

Specifically, in FIG. 13, the resistance value change curve CRA when the temperature of the ink IK in the ink tank TK is the reference temperature t1 is expressed as a resistance value change curve CRA(t1), and the resistance value change curve CRA when the temperature of the ink IK in the ink tank TK is the temperature t2 is expressed as a resistance value change curve CRA(t2).

As shown in FIG. 13, when the temperature of the ink IK in the ink tank TK changes, the resistance value represented by the resistance value change curve CRA also changes. Specifically, when the temperature of the ink IK in the ink tank TK changes from the reference temperature t1 to the temperature t2, the resistance value of the combined resistance RG-A represented by the resistance value change curve CRA also changes. That is, when the ink liquid surface distance SZ is the same value, the resistance value of the combined resistance RG-A represented by the resistance value change curve CRA(t1) is different from the resistance value of the combined resistance RG-A represented by the resistance value change curve CRA(t2).

Note that although FIG. 13 illustrates when the resistance value of the combined resistance RG-A represented by the resistance value change curve CRA changes to a smaller value with the temperature change of the ink IK in the ink tank TK, the present disclosure is not limited to such an aspect. The resistance value of the combined resistance RG-A represented by the resistance value change curve CRA may change to a larger value with the temperature change of the ink IK in the ink tank TK.

As described above, the resistance value change curve CRA related to the first embodiment has the change region A-RA1 in a portion where the ink liquid surface distance SZ becomes the distance H1. That is, in the change region A-RA1 including the portion where the ink liquid surface distance SZ becomes the distance in the resistance value change curve CRA, the resistance value of the combined resistance RG-A represented by the resistance value change curve CRA significantly changes. Therefore, in the vertical axis direction of the graph shown in FIG. 13, a part of the change region A-RA1 provided to the resistance value change curve CRA(t1) overlaps a part of the change region A-RA1 provided to the resistance value change curve CRA (t2).

Further, as described above, the resistance value change curve CRA related to the first embodiment has the change region A-RA2 in a portion where the ink liquid surface distance SZ becomes the distance H2. That is, in the change region A-RA2 including the portion where the ink liquid surface distance SZ becomes the distance H2 in the resistance value change curve CRA, the resistance value of the combined resistance RG-A represented by the resistance value change curve CRA significantly changes. Therefore, in the vertical axis direction of the graph shown in FIG. 13, a part of the change region A-RA2 provided to the resistance value change curve CRA(t1) overlaps a part of the change region A-RA2 provided to the resistance value change curve CRA(t2).

Figure 14:
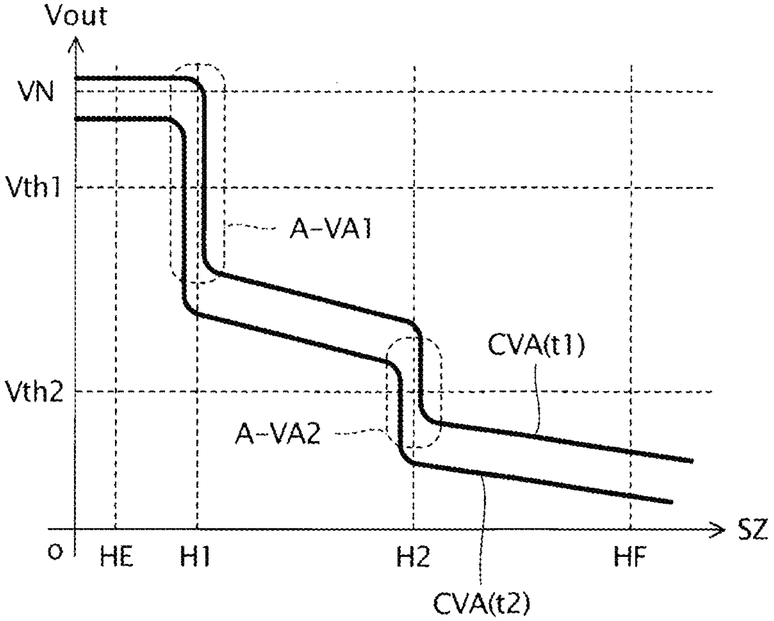
FIG. 14 is a diagram illustrating an example of a temperature change in a potential change curve CVA.

FIG. 14 is a diagram illustrating a temperature change of the potential change curve CVA with the temperature change of the ink IK in the ink tank TK related to the first embodiment.

Specifically, in FIG. 14, the potential change curve CVA when the temperature of the ink IK in the ink tank TK is the reference temperature t1 is expressed as the potential change curve CVA(t1), and the potential change curve CVA when the temperature of the ink IK in the ink tank TK is the temperature t2 is expressed as the potential change curve CVA(t2).

As shown in FIG. 14, when the temperature of the ink IK in the ink tank TK changes, the potential represented by the potential change curve CVA also changes. Specifically, when the temperature of the ink IK in the ink tank TK changes from the reference temperature t1 to the temperature t2, the potential of the output signal Vout-A represented by the potential change curve CVA also changes. That is, when the ink liquid surface distance SZ is the same value, the potential of the output signal Vout-A represented by the potential change curve CVA(t1) is different from the potential of the output signal Vout-A represented by the potential change curve CVA(t2).

Note that although FIG. 14 illustrates when the potential of the output signal Vout-A represented by the potential change curve CVA changes to a smaller value with the temperature change of the ink IK in the ink tank TK, the present disclosure is not limited to such an aspect. The potential of the output signal Vout-A represented by the potential change curve CVA may change to a larger value with the temperature change of the ink IK in the ink tank TK.

As described above, the potential change curve CVA related to the first embodiment has the change region A-VA1, which is a region in which the potential of the output signal Vout-A represented by the potential change curve CVA significantly changes in a portion where the ink liquid surface distance SZ becomes the distance H1. Further, in the vertical axis direction of the graph shown in FIG. 14, the change region A-VA1 provided to the potential change curve CVA(t1) includes a portion where the output signal Vout-A becomes the threshold potential Vth1. That is, the change region A-VA1 provided to the potential change curve CVA (t1) crosses a straight line "Vout=Vth1" in the graph shown in FIG. 14.

Further, since the change region A-VAL is a region in which the potential of the output signal Vout-A represented by the potential change curve CVA significantly changes, a part of the change region A-VA1 provided to the potential change curve CVA(t1) and a part of the change region A-VA1 provided to the potential change curve CVA(t2) overlap each other in the vertical axis direction of the graph shown in FIG. 14. Further, as long as the temperature difference between the reference temperature t1 and the temperature t2 is within a predetermined temperature difference, the change region A-VA1 provided to the potential change curve CVA(t2) also includes a portion where the output signal Vout-A becomes the threshold potential Vth1. That is, as long as the temperature difference between the reference temperature t1 and the temperature t2 is within the predetermined temperature difference, the change region A-VA1 provided to the potential change curve CVA(t2) crosses the straight line "Vout=Vth1" in the graph shown in FIG. 14.

Here, the predetermined temperature difference may be, for example, a temperature difference between the temperature of the ink IK in the ink tank TK and the reference temperature t1 when the inkjet printer 100 is used in a marginal use environment of the inkjet printer 100. Further, the predetermined temperature difference may be, for example, a temperature difference between the ambient temperature of the inkjet printer 100 and the reference temperature t1 when the inkjet printer 100 is used in a marginal use environment of the inkjet printer 100. Further, the predetermined temperature difference may be, for example, a temperature difference between the temperature of the marginal use environment of the ink IK and the reference temperature t1.

Note that also in the reference example, the change region A-VA1 provided to the potential change curve CVW(t1) crosses the straight line "Vout=Vth1" in the graph illustrated in FIG. 12, and the change region A-VA1 provided to the potential change curve CVW(t2) also crosses the straight line "Vout=Vth1" in the graph illustrated in FIG. 12.

As described above, the potential change curve CVA related to the first embodiment has the change region A-VA2, which is a region in which the potential of the output signal Vout-A represented by the potential change curve CVA significantly changes in a portion where the ink liquid surface distance SZ becomes the distance H2. Further, in the vertical axis direction of the graph shown in FIG. 14, the change region A-VA2 provided to the potential change curve CVA(t1) includes a portion where the output signal Vout-A becomes the threshold potential Vth2. That is, the change region A-VA2 provided to the potential change curve CVA (t1) crosses a straight line "Vout=Vth2" in the graph shown in FIG. 14.

Further, since the change region A-VA2 is a region in which the potential of the output signal Vout-A represented by the potential change curve CVA significantly changes, a part of the change region A-VA2 provided to the potential change curve CVA(t1) and a part of the change region A-VA2 provided to the potential change curve CVA(t2) overlap each other in the vertical axis direction of the graph shown in FIG. 14. Therefore, as long as the temperature difference between the reference temperature t1 and the temperature t2 is within the predetermined temperature difference, the change region A-VA2 provided to the potential change curve CVA(t2) also includes a portion where the output signal Vout-A becomes the threshold potential Vth2. That is, as long as the temperature difference between the reference temperature t1 and the temperature t2 is within the predetermined temperature difference, the change region A-VA2 provided to the potential change curve CVA(t2) crosses the straight line "Vout=Vth2" in the graph shown in FIG. 14.

Therefore, according to the first embodiment, when the temperature of the ink IK in the ink tank TK is the reference temperature t1, and when the temperature is the temperature t2, it is possible to identify that the remaining amount of the ink IK in the ink tank TK is less than the amount of ink corresponding to the distance H1 based on the fact that the potential of the output signal Vout-A is higher than the threshold potential Vth1, and to identify that the remaining amount of the ink IK in the ink tank TK is less than the amount of ink corresponding to the distance H2 based on the fact that the potential of the output signal Vout-A is higher than the threshold potential Vth2.

Meanwhile, according to the reference example, similarly to the first embodiment, when the temperature of the ink IK in the ink tank TK-W is the reference temperature t1 and when the temperature is the temperature t2, it is possible to identify that the remaining amount of the ink IK in the ink tank TK-W is less than the amount of ink corresponding to the distance H1 based on the fact that the potential of the output signal Vout-A is higher than the threshold potential Vth1. However, according to the reference example, unlike the present embodiment, when the temperature of the ink IK in the ink tank TK-W is the reference temperature t1 and when the temperature is the temperature t2, the remaining amount of the ink IK in the ink tank TK-W cannot be identified based on the fact that the potential of the output signal Vout-W is higher than the threshold potential Vth2.

That is, according to the inkjet printer 100 related to the first embodiment, it becomes possible to accurately detect the remaining amount of the ink IK in the ink tank TK based on the output signal Vout compared to the inkjet printer according to the reference example.

Note n the present embodiment, the description is presented illustrating when a change occurs in the resistance value of the combined resistance RG due to a temperature change of the ink IK in the ink tank TK, and as a result, a change occurs in the potential of the output signal Vout-A represented by the potential change curve CVA, but the present disclosure is not limited to such an aspect. The present embodiment can be applied to any case where a variation occurs in the potential of the output signal Vout-A represented by the potential change curve CVA.

For example, according to the present embodiment, even when a change occurs in the potential of the output signal Vout-A represented by the potential change curve CVA due to deterioration or denaturation of the ink IK in the ink tank TK, the remaining amount of the ink IK in the ink tank TK can be accurately detected based on the output signal Vout compared to the reference example. Further, according to the present embodiment, even when a change occurs in the potential of the output signal Vout-A represented by the potential change curve CVA due to the superimposition of noise on the output signal Vout-A, the remaining amount of the ink IK in the ink tank TK can be accurately detected based on the output signal Vout compared to the reference example.

1.5. Conclusion of First Embodiment

As described hereinabove, the inkjet printer 100 according to the present embodiment is characterized by including the ink tank TK which stores the ink IK having conductivity, the electrode rod BT housed in the ink tank TK, the electrode rod B1 housed in the ink tank TK, the electrode rod B2 housed in the ink tank TK, the output circuit 20 which is electrically coupled to the electrode rod B1 and the electrode rod B2 and is configured to output the output signal Vout-A corresponding to the electric signals from the electrode rod B1 and the electrode rod B2, and the control device 8 configured to identify a remaining amount of the ink IK stored in the ink tank TK based on the output signal Vout-A, wherein the electrode rod B1 makes contact with the ink IK stored in the ink tank TK when the ink IK equal to or more than the ink amount corresponding to the distance H1 is stored in the ink tank TK, the electrode rod B2 makes contact with the ink IK stored in the ink tank TK when the ink IK equal to or more than the ink amount corresponding to the distance H2 is stored in the ink tank TK, and the electrode rod BT is contact with the ink IK stored in the ink tank TK when the ink IK equal to the ink amount corresponding to the distance H1 is stored in the ink tank TK.

As described above, in the present embodiment, in addition to the electrode rod BT and the electrode rod B1, the electrode rod B2 different in height from the electrode rod B1 is housed in the ink tank TK. That is, in the present embodiment, the output circuit 20 outputs the output signal Vout-A corresponding to the resistance value of the ink IK between the electrode rod BT and the electrode rod B1 when the amount of ink in the ink tank TK is equal to or larger than the ink amount corresponding to the distance H1 and smaller than the ink amount corresponding to the distance H2, and outputs the output signal Vout-A corresponding to the resistance value of the combined resistance RG of the ink IK between the electrode rod BT and the electrode rod B1 and the ink IK between the electrode rod BT and the electrode rod B2 when the amount of ink in the ink tank TK is equal to or larger than the ink amount corresponding to the distance H2. Further, in the present embodiment, the control device 8 identifies the remaining amount of the ink IK stored in the ink tank TK based on the output signal Vout-A corresponding to the electric signals from the electrode rod B1 and the electrode rod B2. Therefore, according to the present embodiment, it becomes possible to increase the potential change in the output signal Vout-A output by the output circuit 20 in the vicinity of a point where the amount of the ink in the ink tank TK is equal to the ink amount corresponding to the distance H2 compared to the aspect in which the electrode rod BT and the electrode rod B1 are housed in the ink tank TK, and the remaining amount of the ink IK stored in the ink tank TK-W is identified based on the output signal Vout-W corresponding to the electric signal from the electrode rod B1 as in the reference example. Therefore, according to the present embodiment, it becomes possible to accurately detect the remaining amount of the ink IK in the ink tank TK compared to the reference example.

2. Second Embodiment

An inkjet printer according to a second embodiment will hereinafter be described with reference to FIG. 15 to FIG. 21. Note that in the aspects hereinafter exemplified, regarding the elements having substantially the same operations and functions as in the first embodiment, the reference numerals and signs used in the description of the first embodiment are diverted thereto to thereby omit the detailed description thereof as appropriate.

2.1. Overview of Inkjet Printer According to Second Embodiment

The inkjet printer according to the second embodiment is different from the inkjet printer 100 according to the first embodiment in that an ink storage device 1B is provided instead of the ink storage device 1A.

Figure 15:
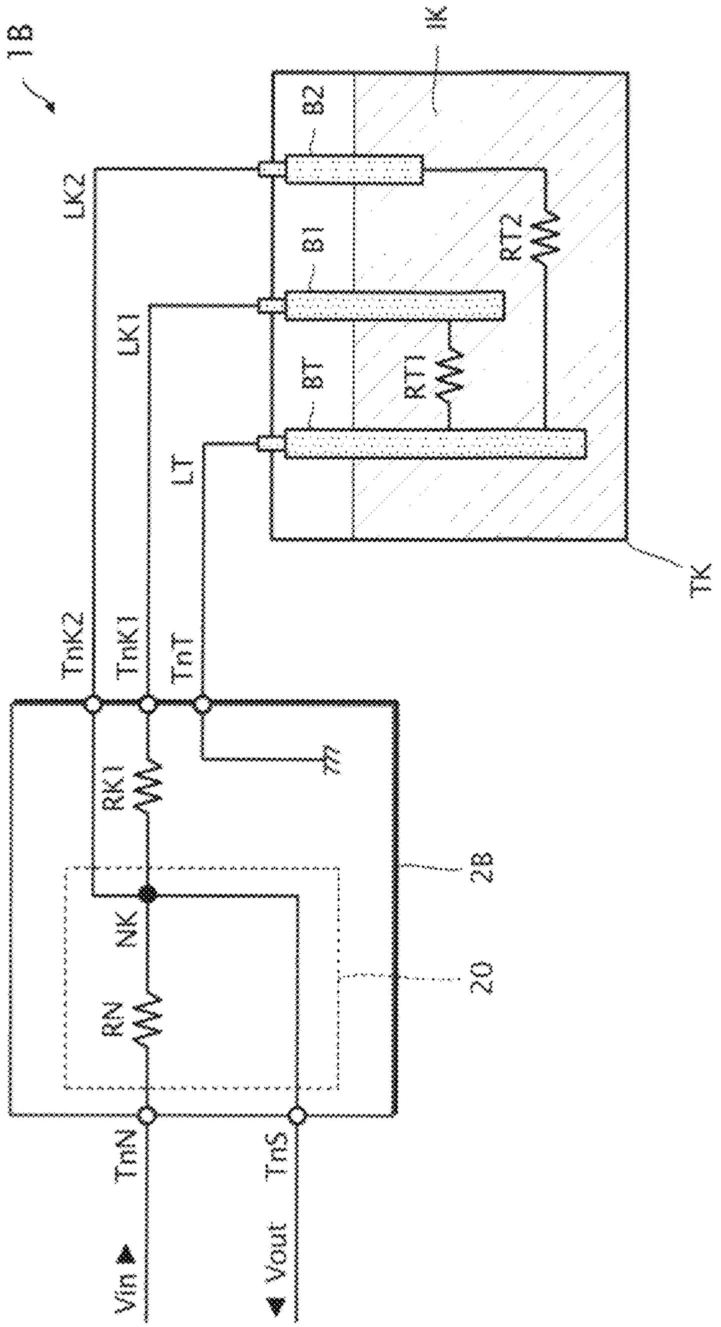
FIG. 15 is a circuit diagram showing an example of a configuration of an ink storage device 1B according to a second embodiment.

FIG. 15 is a circuit diagram illustrating a configuration of the ink storage device 1B.

As shown in FIG. 15, the ink storage device 1B is different from the ink storage device 1A according to the first embodiment in that an ink amount detection circuit 2B is provided instead of the ink amount detection circuit 2A. The ink amount detection circuit 2B is different from the ink amount detection circuit 2A related to the first embodiment in that a resistor RK1 is disposed between the detection terminal InK1 and the node NK. That is, in the second embodiment, it is assumed when the resistance value of the first wiring path from the electrode rod B1 to the node NK via the detection wiring LK1, the detection terminal TnK1, and the resistor RK1 is higher than the resistance value of the second wiring path from the electrode rod B2 to the node NK via the detection wiring LK2 and the detection terminal TnK2.

Note that in the present embodiment, the resistor RK1 is an example of a "resistive element".

Note that in the second embodiment, the combined resistance RG in the electrical coupling path from the electrode rod BT to the node NK is referred to as a combined resistance RG-B.

Figure 16:
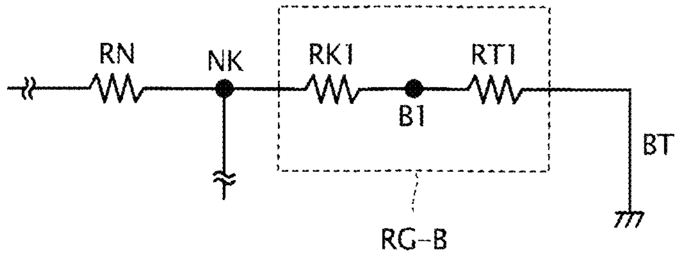
FIG. 16 is a circuit diagram showing an example of a combined resistance RG-B.
Figure 17:
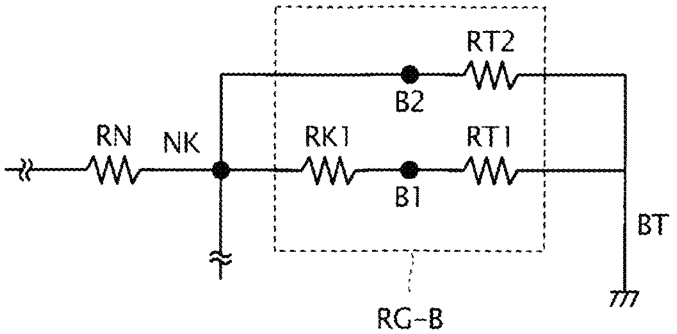
FIG. 17 is a circuit diagram showing an example of the combined resistance RG-B.

FIG. 16 and FIG. 17 are circuit diagrams illustrating the combined resistance RG-B related to the second embodiment. Out of these, FIG. 16 is a diagram showing the combined resistance RG-B obtained when the ink liquid surface distance SZ is equal to or greater than the distance H1 and less than the distance H2. Further, FIG. 17 is a diagram showing the combined resistance RG-B obtained when the ink liquid surface distance SZ is equal to or greater than the distance H2.

When the ink liquid surface distance SZ is equal to or greater than the distance H1 and less than the distance H2, the electrode rod BT and the electrode rod B1 are electrically coupled to each other with the ink IK, while the electrode rod BT and the electrode rod B2 are not electrically coupled to each other. Therefore, when the ink liquid surface distance SZ is equal to or greater than the distance H1 and less than the distance H2, as shown in FIG. 16, the combined resistance RG-B is substantially the same as the combined resistance of the ink resistance RT1 and the resistor RK1 when the ink resistance RT1 and the resistor RK1 are coupled in series to each other. That is, when the combined resistance RG-B obtained when the ink liquid surface distance SZ is equal to or greater than the distance H1 and less than the distance H2 is referred to as a combined resistance RG1, the resistance value of the combined resistance RG1 is expressed by the following formula (1). Note that in the following formula, the reference symbol of each of the resistances is diverted to the resistance value of that resistance.

$$RG1 = RT1 + RK1 \tag{1}$$

When the ink liquid surface distance SZ is equal to or greater than the distance H2, the electrode rod BT and the electrode rod B1 are electrically coupled to each other with the ink IK, and the electrode rod BT and the electrode rod B2 are electrically coupled to each other with the ink IK. Therefore, when the ink liquid surface distance SZ is equal to or greater than the distance H2, as shown in FIG. 17, the combined resistance RG-B is substantially the same as a combined resistance of the ink resistance RT1, the ink resistance RT2, and the resistor RK1 when a resistance obtained by coupling the ink resistance RT1 and the resistor RK1 in series to each other and the ink resistance RT2 are coupled in parallel to each other. That is, when the combined resistance RG-B obtained when the ink liquid surface distance SZ is equal to or greater than the distance H2 is referred to as a combined resistance RG2, a resistance value of the combined resistance RG2 is expressed by the following formula (2).

$$RG2 = \{(RT1 + RK1) * RT2\}/\{RT1 + RT2 + RK1\} \tag{2}$$

Figure 18:
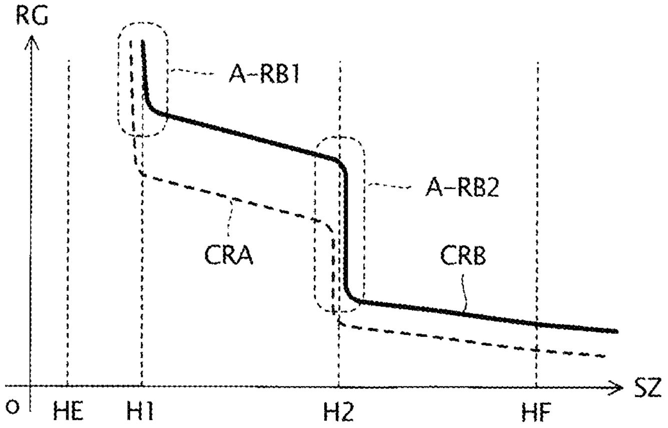
FIG. 18 is a diagram illustrating an example of a relationship between the ink liquid surface distance SZ and the combined resistance RG.

2.2. Relationship Between Ink Liquid Surface Distance, and Combined Resistance and Output Signal FIG. 18 is a diagram illustrating a resistance value change curve CRB related to the second embodiment and the resistance value change curve CRA related to the first embodiment. Here, the resistance value change curve CRB is a curve representing a relationship between the resistance value of the combined resistance RG-B and the ink liquid surface distance SZ in the second embodiment. Note that in FIG. 18, the relationship between the ink liquid surface distance SZ and the resistance value of the combined resistance RG-B is expressed as the resistance value change curve CRB, and the relationship between the ink liquid surface distance SZ and the resistance value of the combined resistance RG-A is expressed as the resistance value change curve CRA by setting the horizontal axis as the ink liquid surface distance SZ and the vertical axis as the resistance value of the combined resistance RG.

As represented by the resistance value change curve CRB in FIG. 18, also in the second embodiment, similarly to the first embodiment, when the ink liquid surface distance SZ is equal to or greater than the distance H1, the combined resistance RG-B has a smaller resistance value compared to when the ink liquid surface distance SZ is less than the distance H1. That is, it results in that in the present embodiment, the resistance value change curve CRB has a change region A-RB1 in which the combined resistance RG-B significantly changes at the boundary between when the ink liquid surface distance SZ is less than the distance H1 and when the ink liquid surface distance SZ is equal to or greater than the distance H1.

Further, as represented by the resistance value change curve CRB in FIG. 18, also in the second embodiment, similarly to the first embodiment, when the ink liquid surface distance SZ is equal to or greater than the distance H1 and less than the distance H2, the resistance value of the combined resistance RG-B decreases as the ink liquid surface distance SZ elongates.

Further, as represented by the resistance value change curve CRB in FIG. 18, also in the second embodiment, similarly to the first embodiment, when the ink liquid surface distance SZ is equal to or greater than the distance H2, the combined resistance RG-B has a smaller resistance value compared to when the ink liquid surface distance SZ is less than the distance H2. That is, it results in that in the second embodiment, the resistance value change curve CRB has a change region A-RB2 in which the combined resistance RG-B significantly changes at the boundary between when the ink liquid surface distance SZ is less than the distance H2 and when the ink liquid surface distance SZ is equal to or greater than the distance H2.

Further, as represented by the resistance value change curve CRB in FIG. 18, also in the second embodiment, similarly to the first embodiment, when the ink liquid surface distance SZ is equal to or greater than the distance H2, the resistance value of the combined resistance RG-B decreases as the ink liquid surface distance SZ elongates.

Note that, as described above, the ink amount detection circuit 2B related to the second embodiment includes the resistor RK1, whereas the ink amount detection circuit 2A related to the first embodiment does not include the resistor RK1. Therefore, as shown in FIG. 18, the resistance value of the combined resistance RG-B represented by the resistance value change curve CRB is higher than the resistance value of the combined resistance RG-A represented by the resistance value change curve CRA.

Figure 19:
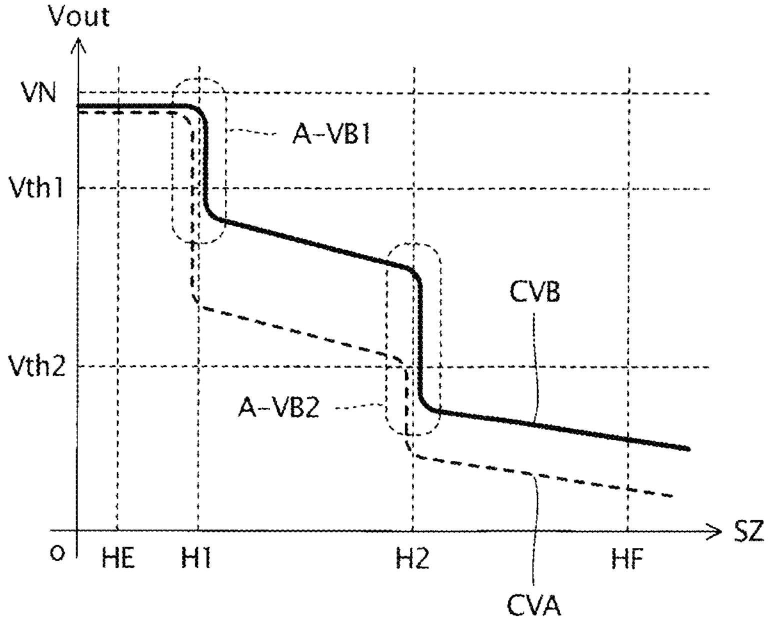
FIG. 19 is a diagram illustrating an example of a relationship between the ink liquid surface distance SZ and the output signal Vout.

FIG. 19 is a diagram illustrating a potential change curve CVB related to the second embodiment and a potential change curve CVA related to the first embodiment. Here, the potential change curve CVB means a curve representing a relationship between the output signal Vout output by the ink amount detection circuit 2B in the second embodiment and the ink liquid surface distance SZ. Note that in FIG. 19, the horizontal axis represents the ink liquid surface distance SZ, and the vertical axis represents the potential of the output signal Vout according to the second embodiment, whereby the relationship between the ink liquid surface distance SZ and the potential of the output signal Vout related to the second embodiment is expressed as the potential change curve CVB, and the relationship between the ink liquid surface distance SZ and the potential of the output signal Vout-A related to the first embodiment is expressed as the potential change curve CVA.

In the following description, when distinction is required, the output signal Vout output by the ink amount detection circuit 2B in the second embodiment may be referred to as an output signal Vout-B in some cases.

As represented by the potential change curve CVB in FIG. 19, also in the second embodiment, similarly to the first embodiment, the potential of the output signal Vout-B decreases as the ink liquid surface distance SZ elongates.

As described above, the resistance value change curve CRB includes the change region A-RB1 and the change region A-RB2. Therefore, as shown in FIG. 19, the potential change curve CVB also has a change region A-VB1 and a change region A-VB2 in which the rate of change of the potential of the output signal Vout-B increases with respect to the change in the ink liquid surface distance SZ. Here, the change region A-VB1 is a region corresponding to the change region A-RB1, and is a region in which the potential of the output signal Vout-B significantly changes at the boundary between when the ink liquid surface distance SZ is less than the distance H1 and when the ink liquid surface distance SZ is equal to or greater than the distance H1. Further, the change region A-VB2 is a region corresponding to the change region A-RB2, and is a region in which the potential of the output signal Vout-B significantly changes at the boundary between when the ink liquid surface distance SZ is less than the distance H2 and when the ink liquid surface distance SZ is equal to or greater than the distance H2.

As shown in FIG. 19, in the second embodiment, a potential represented by the output signal Vout-B when the temperature of the ink IK in the ink tank TK is the reference temperature t1 and the ink liquid surface distance SZ in the ink tank TK is the distance H1, is referred to as the threshold potential Vth1. Further, in the second embodiment, a potential represented by the output signal Vout-B when the temperature of the ink IK in the ink tank TK is the reference temperature t1 and the ink liquid surface distance SZ in the ink tank TK is the distance H2, is referred to as the threshold potential Vth2.

Further, in the second embodiment, the control device 8 identifies the remaining amount of the ink IK stored in the ink tank TK based on the output signal Vout-B. Specifically, in the second embodiment, the control device 8 identifies that the remaining amount of the ink IK in the ink tank TK is less than an ink amount corresponding to the distance H1 when the potential of the output signal Vout-B is higher than the threshold potential Vth1, and identifies that the remaining amount of the ink IK in the ink tank TK is larger than the ink amount corresponding to the distance H1 when the potential of the output signal Vout-B is lower than the threshold potential Vth1. Further, in the second embodiment, the control device 8 identifies that the remaining amount of the ink IK in the ink tank TK is less than an ink amount corresponding to the distance H2 when the potential of the output signal Vout-B is higher than the threshold potential Vth2, and identifies that the remaining amount of the ink IK in the ink tank TK is larger than the ink amount corresponding to the distance H2 when the potential of the output signal Vout-B is lower than the threshold potential Vth2.

Note that the amount of change in the combined resistance RG-A in the change region A-RA2 related to the first embodiment is referred to as a change amount GPA, and the amount of change in the combined resistance RG-B in the change region A-RB2 related to the second embodiment is referred to as a change amount GPB. In this case, the change amount GPA is expressed by the following formula (3) as an example, and the change amount GPB is expressed by the following formula (4) as an example.

$$GPA = RT1 - \left[\{RT1 * RT2\}/\{RT1 + RT2\}\right] \tag{3}$$

$$GPB = RG1 - RG2 = [RT1 + RK1] - \left[\{(RT1 + RK1) * RT2\}/\{RT1 + RT2 + RK1\}\right] \tag{4}$$

Here, for the sake of convenience of explanation, "RT1=RT2=RT0" is assumed. In this case, the change amount GPA is expressed by the following formula (5) as an example, and the change amount GPB is expressed by the following formula (6) as an example.

$$GPA = \left(1/2\right) * RT0 \tag{5}$$

$$GPB = \left[RT0^2 + RK1^2 + 2 * RT0 * RK1\right]/[2 * RT0 + RK1] \tag{6}$$

Further, the value obtained by subtracting the change amount GPA from the change amount GPB is a non-negative value as shown in, for example, the following formula (7).

$$GPB - GPA = \left[2 * RK1^2 + 3 * RT0 * RK1\right]/[2 * (2 * RT0 + RK1)] \tag{7}$$

That is, according to the second embodiment, since the ink amount detection circuit 2B includes the resistor RK1, the amount of change in the combined resistance RG-B in the change region A-RB2 provided to the resistance value change curve CRB can be made larger than the amount of change in the combined resistance RG-A in the change region A-RA2 provided to the resistance value change curve CRA. Therefore, according to the second embodiment, compared to the first embodiment, the amount of change in the potential of the output signal Vout-B in the change region A-VB2 provided to the potential change curve CVB can be made larger than the amount of change in the potential of the output signal Vout-A in the change region A-VA2 provided to the potential change curve CVA. That is, according to the second embodiment, compared to the first embodiment, it becomes possible to increase the potential change of the output signal Vout-B output by the output circuit 20 in the vicinity of the point where the amount of ink in the ink tank TK is the ink amount corresponding to the distance H2. Therefore, according to the second embodiment, it becomes possible to accurately detect the remaining amount of the ink IK in the ink tank TK compared to the first embodiment.

Note that in the second embodiment, it is preferable for the resistor RK1 to be a resistor having a resistance value larger than the maximum value of the resistance value of the ink resistance RT1 when the ink liquid surface distance SZ is equal to or greater than the distance H1. Further, in the second embodiment, it is preferable for the resistor RK1 to be a resistor having a resistance value larger than the maximum value of the resistance value of the ink resistance RT2 when the ink liquid surface distance SZ is equal to or greater than the distance H2. In the second embodiment, by adopting a resistor having a large resistance value as the resistor RK1, it becomes possible to increase the potential change of the output signal Vout-B output by the output circuit 20 in the vicinity of the point where the ink amount in the ink tank TK is the ink amount corresponding to the distance H2.

Figure 20:
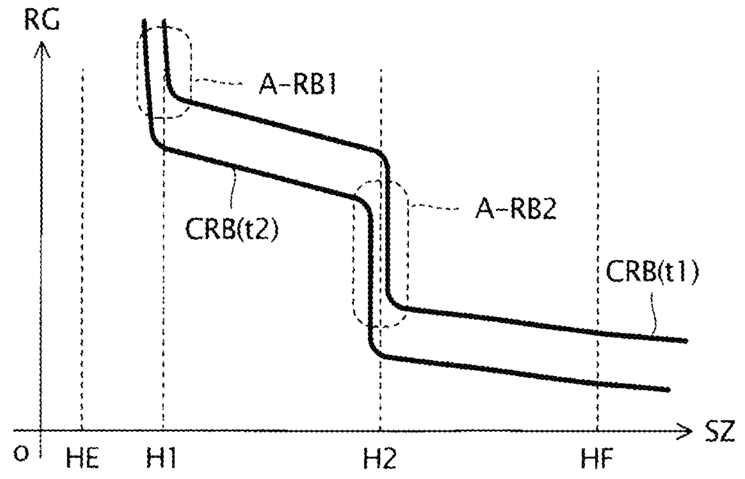
FIG. 20 is a diagram illustrating an example of a temperature change in a resistance value change curve CRB.

FIG. 20 is a diagram illustrating a temperature change of the resistance value change curve CRB with the temperature change of the ink IK in the ink tank TK related to the second embodiment.

Specifically, in FIG. 20, the resistance value change curve CRB when the temperature of the ink IK in the ink tank TK is the reference temperature t1 is expressed as a resistance value change curve CRB(t1), and the resistance value change curve CRB when the temperature of the ink IK in the ink tank TK is the temperature t2 is expressed as a resistance value change curve CRB(t2).

As shown in FIG. 20, when the temperature of the ink IK in the ink tank TK changes, the resistance value represented by the resistance value change curve CRB also changes. Specifically, when the ink liquid surface distance SZ is the same value, the resistance value of the combined resistance RG-B represented by the resistance value change curve CRB(t1) is different from the resistance value of the combined resistance RG-B represented by the resistance value change curve CRB(t2).

As described above, the resistance value change curve CRB has the change region A-RB1 in a portion where the ink liquid surface distance SZ becomes the distance H1. That is, in the change region A-RB1 including the portion where the ink liquid surface distance SZ becomes the distance H1 in the resistance value change curve CRB, the resistance value of the combined resistance RG-B represented by the resistance value change curve CRB significantly changes. Therefore, in the vertical axis direction of the graph shown in FIG. 20, a part of the change region A-RB1 provided to the resistance value change curve CRB (t1) overlaps a part of the change region A-RB1 provided to the resistance value change curve CRB(t2).

Further, as described above, the resistance value change curve CRB has the change region A-RB2 in a portion where the ink liquid surface distance SZ becomes the distance H2. That is, in the change region A-RB2 including the portion where the ink liquid surface distance SZ becomes the distance H2 in the resistance value change curve CRB, the resistance value of the combined resistance RG-B represented by the resistance value change curve CRB significantly changes. Therefore, in the vertical axis direction of the graph shown in FIG. 20, a part of the change region A-RB2 provided to the resistance value change curve CRB (t1) overlaps a part of the change region A-RB2 provided to the resistance value change curve CRB(t2).

Figure 21:
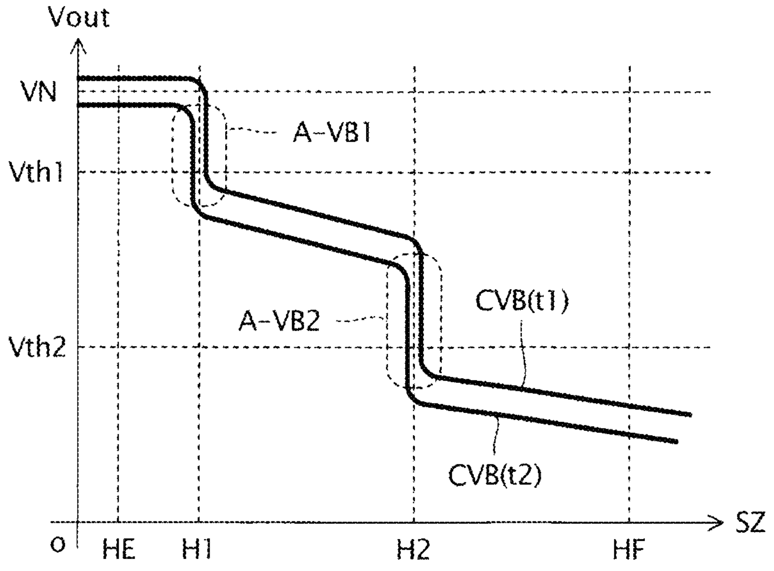
FIG. 21 is a diagram illustrating an example of a temperature change in a potential change curve CVB.

FIG. 21 is a diagram illustrating a temperature change of the potential change curve CVB with the temperature change of the ink IK in the ink tank TK related to the second embodiment.

Specifically, in FIG. 21, the potential change curve CVB when the temperature of the ink IK in the ink tank TK is the reference temperature t1 is expressed as the potential change curve CVB(t1), and the potential change curve CVB when the temperature of the ink IK in the ink tank TK is the temperature t2 is expressed as the potential change curve CVB(t2).

As shown in FIG. 21, when the temperature of the ink IK in the ink tank TK changes, the potential represented by the potential change curve CVB also changes. Specifically, when the ink liquid surface distance SZ is the same value, the potential of the output signal Vout-B represented by the potential change curve CVB(t1) is different from the potential of the output signal Vout-B represented by the potential change curve CVB(t2).

As described above, the potential change curve CVB has the change region A-VB1, which is a region in which the potential of the output signal Vout-B represented by the potential change curve CVB significantly changes in the portion where the ink liquid surface distance SZ becomes the distance H1. Further, the change region A-VB1 provided to the potential change curve CVB(t1) crosses the straight line "Vout=Vth1" in the graph shown in FIG. 21.

Further, since the change region A-VB1 is a region in which the potential of the output signal Vout-B represented by the potential change curve CVB significantly changes, a part of the change region A-VB1 provided to the potential change curve CVB(t1) and a part of the change region A-VB1 provided to the potential change curve CVB(t2) overlap each other in the vertical axis direction of the graph shown in FIG. 21. Further, as long as the temperature difference between the reference temperature t1 and the temperature t2 is within a predetermined temperature difference, the change region A-VB1 provided to the potential change curve CVB(t2) crosses the straight line "Vout=Vth1" in the graph shown in FIG. 21.

As described above, the potential change curve CVB has the change region A-VB2, which is a region in which the potential of the output signal Vout-B represented by the potential change curve CVB significantly changes in the portion where the ink liquid surface distance SZ becomes the distance H2. Further, the change region A-VB2 provided to the potential change curve CVB(t1) crosses the straight line "Vout=Vth2" in the graph shown in FIG. 21.

Further, since the change region A-VB2 is a region in which the potential of the output signal Vout-B represented by the potential change curve CVB significantly changes, a part of the change region A-VB2 provided to the potential change curve CVB(t1) and a part of the change region A-VB2 provided to the potential change curve CVB(t2) overlap each other in the vertical axis direction of the graph shown in FIG. 21. Therefore, as long as the temperature difference between the reference temperature t1 and the temperature t2 is within a predetermined temperature difference, the change region A-VB2 provided to the potential change curve CVB(t2) crosses the straight line "Vout=Vth2" in the graph shown in FIG. 21.

Therefore, according to the second embodiment, when the temperature of the ink IK in the ink tank TK is the reference temperature t1, and when the temperature is the temperature t2, it is possible to identify that the remaining amount of the ink IK in the ink tank TK is less than the amount of ink corresponding to the distance H1 based on the fact that the potential of the output signal Vout-B is higher than the threshold potential Vth1, and to identify that the remaining amount of the ink IK in the ink tank TK is less than the amount of ink corresponding to the distance H2 based on the fact that the potential of the output signal Vout-B is higher than the threshold potential Vth2.

That is, according to the inkjet printer 100 related to the second embodiment, it becomes possible to accurately detect the remaining amount of the ink IK in the ink tank TK based on the output signal Vout compared to the inkjet printer according to the reference example described above.

Note that the second embodiment can be applied to any cases in which the potential of the output signal Vout-B fluctuates in addition to when the potential of the output signal Vout-B changes due to the temperature change of the ink IK in the ink tank TK similarly to the first embodiment.

2.3. Conclusion of Second Embodiment

As described hereinabove, the inkjet printer according to the second embodiment is characterized by including the ink tank TK which stores the ink IK having conductivity, the electrode rod BT housed in the ink tank TK, the electrode rod B1 housed in the ink tank TK, the electrode rod B2 housed in the ink tank TK, the output circuit 20 which is electrically coupled to the electrode rod B1 and the electrode rod B2 and is configured to output the output signal Vout-B corresponding to the electric signals from the electrode rod B1 and the electrode rod B2, and the control device 8 configured to identify a remaining amount of the ink IK stored in the ink tank TK based on the output signal Vout-B, wherein the electrode rod B1 makes contact with the ink IK stored in the ink tank TK when the ink IK equal to or more than the ink amount corresponding to the distance H1 is stored in the ink tank TK, the electrode rod B2 makes contact with the ink IK stored in the ink tank TK when the ink IK equal to or more than the ink amount corresponding to the distance H2 is stored in the ink tank TK, the electrode rod BT is contact with the ink IK stored in the ink tank TK when the ink IK equal to the ink amount corresponding to the distance H1 is stored in the ink tank TK, and the resistance value of the first wiring path from the electrode rod B1 to the output circuit 20 is higher than the resistance value of the second wiring path from the electrode rod B2 to the output circuit 20.

Therefore, according to the present embodiment, it becomes possible to increase the potential change in the output signal Vout-B output by the output circuit 20 in the vicinity of a point where the amount of the ink in the ink tank TK is equal to the ink amount corresponding to the distance H2 compared to the aspect in which the electrode rod BT and the electrode rod B1 are housed in the ink tank TK, and the remaining amount of the ink IK stored in the ink tank TK-W is identified based on the output signal Vout-W corresponding to the electric signal from the electrode rod B1 as in the reference example. Therefore, according to the present embodiment, it becomes possible to accurately detect the remaining amount of the ink IK in the ink tank TK compared to the reference example.

Further, according to the present embodiment, since the resistance value of the first wiring path is higher than the resistance value of the second wiring path, it is possible to increase the potential change of the output signal Vout-B output by the output circuit 20 in the vicinity of the point where the amount of ink in the ink tank TK becomes the ink amount corresponding to the distance H2 compared to when the resistance value of the first wiring path is equal to or less than the resistance value of the second wiring path. Therefore, according to the present embodiment, it becomes possible to accurately detect the remaining amount of the ink IK in the ink tank TK compared to the first embodiment.

Further, the inkjet printer according to the second embodiment is characterized in that the resistor RK1 is provided to the first wiring path.

Therefore, according to the present embodiment, it becomes possible to accurately detect the remaining amount of the ink IK in the ink tank TK compared to an aspect in which the resistor RK1 is not provided to the first wiring path.

Further, the inkjet printer according to the second embodiment may be characterized in that the resistance value of the resistor RK1 is higher than the resistance value of the ink resistance RT1 between the electrode rod BT and the electrode rod B1.

Therefore, according to the present embodiment, it becomes possible to accurately detect the remaining amount of the ink IK in the ink tank TK compared to when the resistance value of the resistor RK1 is equal to or less than the resistance value of the ink resistance RT1.

Further, the inkjet printer according to the second embodiment may be characterized in that the ink IK can be replenished to the ink tank TK from the supply port 12, and the ink amount corresponding to the distance H2 is an amount based on the maximum amount of the ink IK that can be stored in the ink tank TK.

In this case, when the ink IK is replenished in the ink tank TK, it becomes possible to confirm in advance the possibility that the ink IK overflows from the ink tank TK.

Further, the inkjet printer according to the second embodiment may be characterized in that the ink amount corresponding to the distance H1 is an amount based on the minimum amount of the ink IK in the ink tank TK.

In this case, it becomes possible to confirm in advance the depletion of the ink IK in the ink tank TK.

3. Modified Examples

The aspects exemplified hereinabove can variously be modified. Specific aspects of the modification will be exemplified below. Two or more aspects randomly selected from the following exemplifications can be combined as appropriate within a range in which no mutual confliction exists.

3.1. Modified Example 1

In the first embodiment and the second embodiment described above, the description is presented citing the aspect in which three electrode rods, namely the electrode rod BT, the electrode rod B1, and the electrode rod B2, are housed in the ink tank TK as an example, but the present disclosure is not limited to such an aspect. In the ink tank, two electrode rods may be housed, or four or more electrode rods may be housed.

Figure 22:
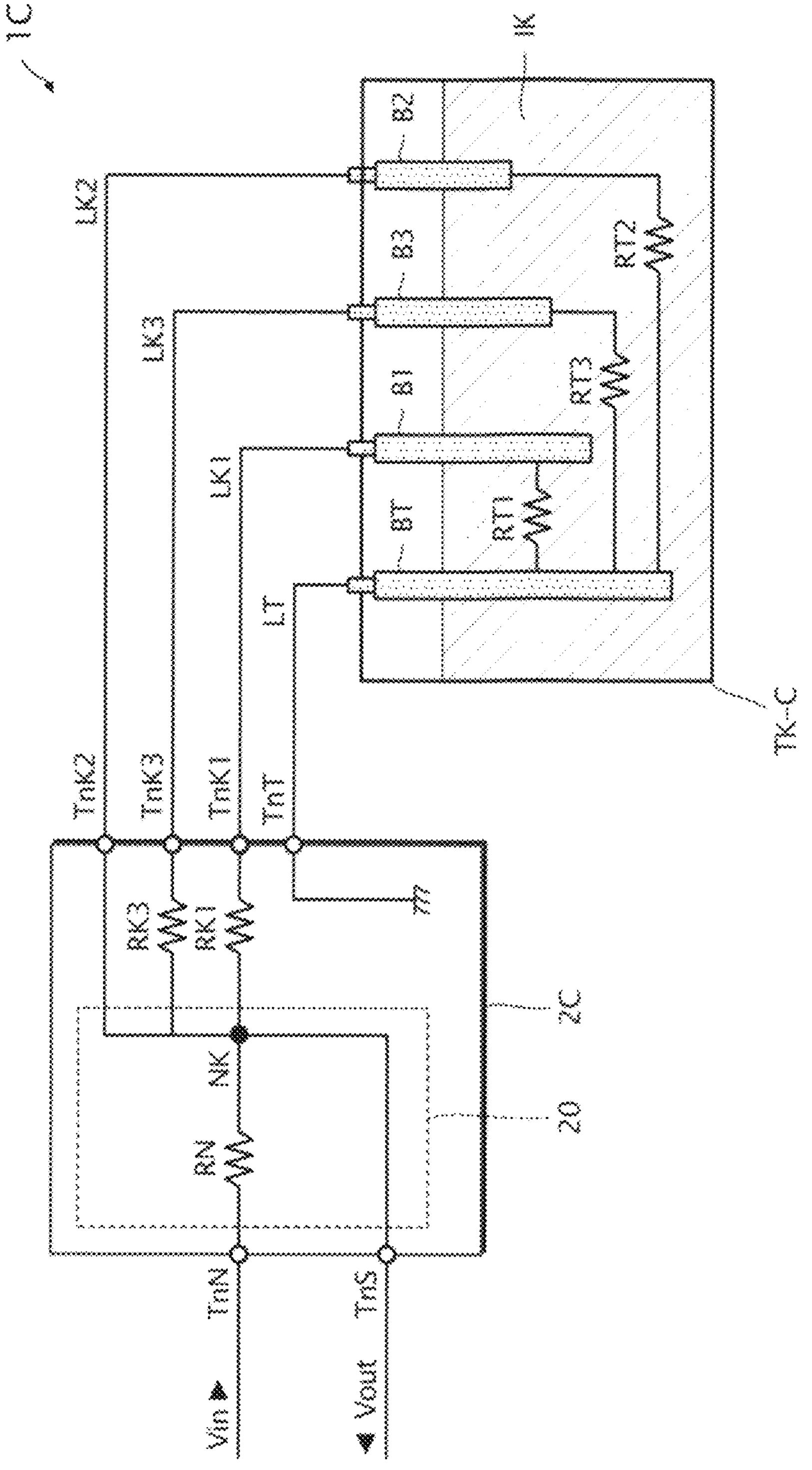
FIG. 22 is a circuit diagram showing an example of a configuration of an ink storage device 1C according to Modified Example 1.

FIG. 22 is a circuit diagram illustrating a configuration of an ink storage device 1C. Note that the inkjet printer according to the present modified example is different from the inkjet printer 100 according to the first embodiment in that the ink storage device 1C is provided instead of the ink storage device 1A.

As shown in FIG. 22, the ink storage device 1C is different from the ink storage device 1A according to the first embodiment in that an ink amount detection circuit 2C is provided instead of the ink amount detection circuit 2A and an ink tank TK-C is provided instead of the ink tank TK.

Among these, the ink tank TK-C is different from the ink tank TK according to the first embodiment in that an electrode rod B3 is provided in addition to the electrode rod BT, the electrode rod B1, and the electrode rod B2. In the following description, an electrical resistance of the ink IK that electrically couples the electrode rod BT and the electrode rod B3 to each other when the ink IK is stored in the ink tank TK-C, and the electrode rod BT and the electrode rod B3 are in contact with the ink IK stored in the ink tank TK-C, is referred to as an ink resistance RT3.

Further, the ink amount detection circuit 2C is different from the ink amount detection circuit 2 related to the first embodiment in that the ink amount detection circuit 2C includes a detection terminal TnK3 and a resistor RK3. The detection terminal TnK3 is electrically coupled to the electrode rod B3 via detection wiring LK3. The resistor RK3 is disposed between the detection terminal TnK3 and the node NK, and electrically couples the detection terminal TnK3 and the node NK.

In the present modified example, it is assumed when the resistance value of the resistor RK3 is lower than the resistance value of the resistor RK1. That is, in this modified example, it is assumed that the resistance value of a third wiring path from the electrode rod B3 to the node NK via the detection wiring LK3, the detection terminal TnK3, and the resistor RK3 is lower than the resistance value of the first wiring path from the electrode rod B1 to the node NK via the detection wiring LK1, the detection terminal TnK1, and the resistor RK1, and is higher than the resistance value of the second wiring path from the electrode rod B2 to the node NK via the detection wiring LK2 and the detection terminal TnK2.

Figure 23:
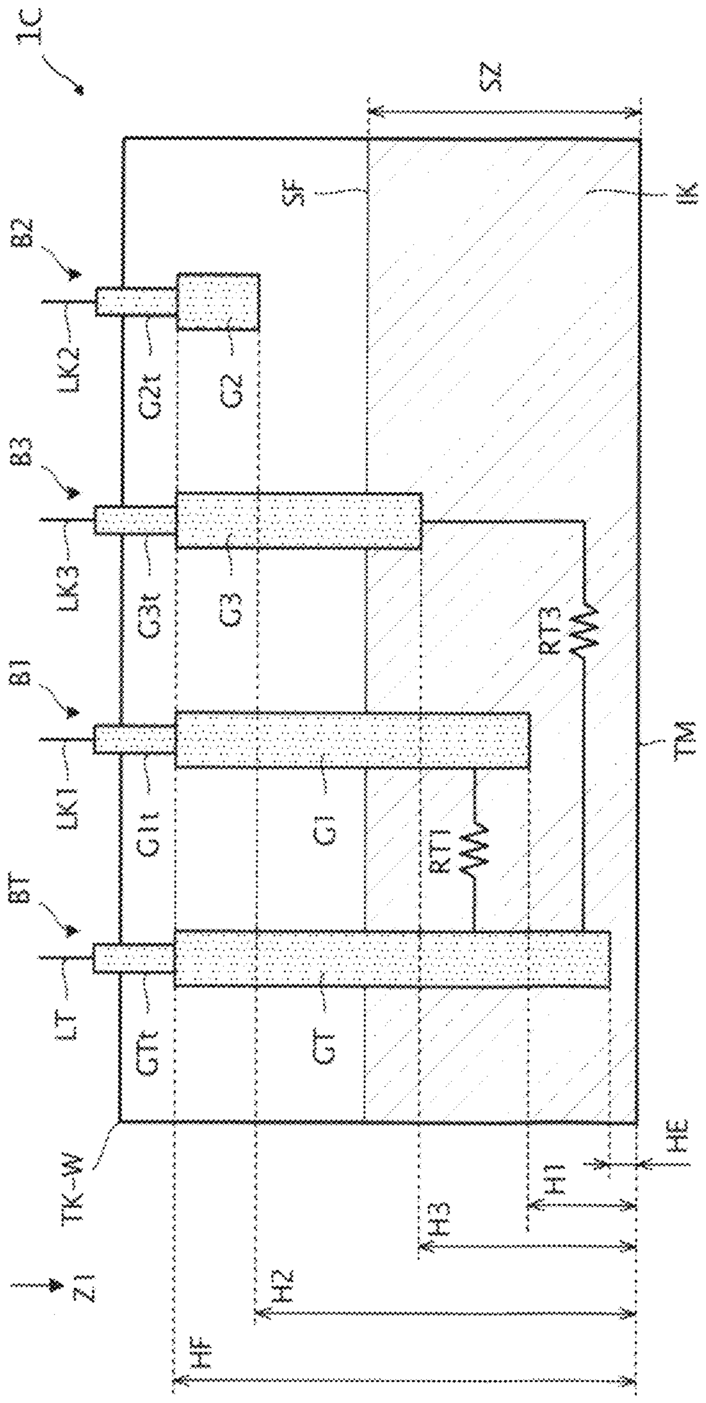
FIG. 23 is a diagram illustrating an example of a configuration of an ink tank TK-W.

FIG. 23 is a configuration diagram showing an example of the configuration of the ink tank TK-C.

As shown in FIG. 23, the electrode rod B1 has an electrode forming portion G3 which has conductivity and extends in the Z1 direction, and a coupling portion G3*t* which has conductivity, extends in the Z1 direction, and electrically couples the electrode forming portion G3 and the detection wiring LK3 to each other. In the present modified example, it is assumed when the electrode rod B3 is disposed such that a distance in the Z-axis direction from an end portion in the Z1 direction of the electrode rod B3 to the bottom surface TM of the ink tank TK-C becomes a distance H3. Here, the distance H3 is a distance satisfying "H1<H3<H2".

Further, in the present modified example, it is assumed, as an example, when the electrode rod B3 is disposed such that a distance in the Z-axis direction from an end portion in the Z2 direction of the electrode forming portion G3 to the bottom surface TM of the ink tank TK-C becomes the distance HF.

As shown in FIG. 23, when the ink IK is present between the electrode rod BT and the electrode rod B3, that is, when the ink liquid surface distance SZ is equal to or greater than the distance H3, the electrode rod BT and the electrode rod B3 are electrically coupled to each other with the ink IK. Therefore, when the ink liquid surface distance SZ is equal to or greater than the distance H3, the electrode rod BT and the electrode rod B3 are electrically coupled to each other with the ink IK having the ink resistance RT3.

Note that in the present embodiment, an amount of ink in the ink tank TK-C which makes the ink liquid surface distance SZ become the distance H3 is an example of a "third amount".

Note that in the present modified example, an electrical resistance in the electrical coupling path from the electrode rod BT to the node NK is referred to as a combined resistance RG-C. When the electrical resistances of the detection wiring LK1, the detection wiring LK2, the detection wiring LK3, the electrode rod B1, the electrode rod B2, and the electrode rod B3 are sufficiently small, it results in that the combined resistance RG-C has substantially the same resistance value as the combined resistance of the ink resistance RT1, the ink resistance RT2, the ink resistance RT3, the resistor RK1, and the resistor RK3.

As described hereinabove, the inkjet printer according to Modified Example 1 is characterized by including the ink tank TK-C which stores the ink IK having conductivity, the electrode rod BT housed in the ink tank TK-C, the electrode rod B1 housed in the ink tank TK-C, the electrode rod B2 housed in the ink tank TK-C, the electrode rod B3 housed in the ink tank TK-C, the output circuit 20 which is electrically coupled to the electrode rod B1, the electrode rod B2, and the electrode rod B3, and is configured to output the output signal Vout corresponding to the electric signals from the electrode rod B1, the electrode rod B2, and the electrode rod 3, and the control device 8 configured to identify the remaining amount of the ink IK stored in the ink tank TK-C based on the output signal Vout, wherein the electrode rod B1 makes contact with the ink IK stored in the ink tank TK-C when the ink IK equal to or more than the ink amount corresponding to the distance H1 is stored in the ink tank TK-C, the electrode rod B2 makes contact with the ink IK stored in the ink tank TK-C when the ink IK equal to or more than the ink amount corresponding to the distance H2 is stored in the ink tank TK-C, the electrode rod B3 makes contact with the ink IK stored in the ink tank TK-C when the ink IK equal to or more than the ink amount corresponding to the distance H3 is stored in the ink tank TK-C, the electrode rod BT is contact with the ink IK stored in the ink tank TK-C when the ink IK equal to the ink amount corresponding to the distance H1 is stored in the ink tank TK-C, the ink amount corresponding to the distance H3 is an ink amount more than the ink amount corresponding to the distance H1 and less than the ink amount corresponding to the distance H2, and the resistance value of the third wiring path from the electrode rod B3 to the output circuit 20 is lower than the resistance value of the first wiring path from the electrode rod B1 to the output circuit 20 and higher than resistance value of the second wiring path from the electrode rod B2 to the output circuit 20.

Therefore, according to Modified Example 1, it becomes possible to increase the potential change in the output signal Vout output by the output circuit 20 in the vicinity of a point where the amount of the ink in the ink tank TK-C is equal to the ink amount corresponding to the distance H3 and in the vicinity of a point where the amount of the ink in the ink tank TK-C is equal to the ink amount corresponding to the distance H2 compared to the aspect in which the electrode rod BT and the electrode rod B1 are housed in the ink tank TK-W, and the remaining amount of the ink IK stored in the ink tank TK-W is identified based on the output signal Vout-W corresponding to the electric signal from the electrode rod B1 as in the reference example. Therefore, according to Modified Example 1, it becomes possible to accurately detect the remaining amount of the ink IK in the ink tank TK-C compared to the reference example.

Further, according to Modified Example 1, compared to the first embodiment, it becomes possible to increase the potential change of the output signal Vout output by the output circuit 20 in the vicinity of the point where the amount of ink in the ink tank TK-C is the ink amount corresponding to the distance H3. Therefore, according to Modified Example 1, it becomes possible to accurately detect the remaining amount of the ink IK in the ink tank TK-C compared to the first embodiment.

3.2. Modified Example 2

In the first embodiment, the second embodiment, and Modified Example 1 described above, the description is presented citing when the ink storage device 1A to the ink storage device 1C each include the output circuit 20 as an example, but the present disclosure is not limited to such an aspect. It is sufficient for the ink storage device 1 to include the output circuit 20 capable of detecting the remaining amount of the ink IK stored in the ink tank TK based on an electric signal from one electrode rod or a plurality of electrode rods provided to the ink tank TK.

Figure 24:
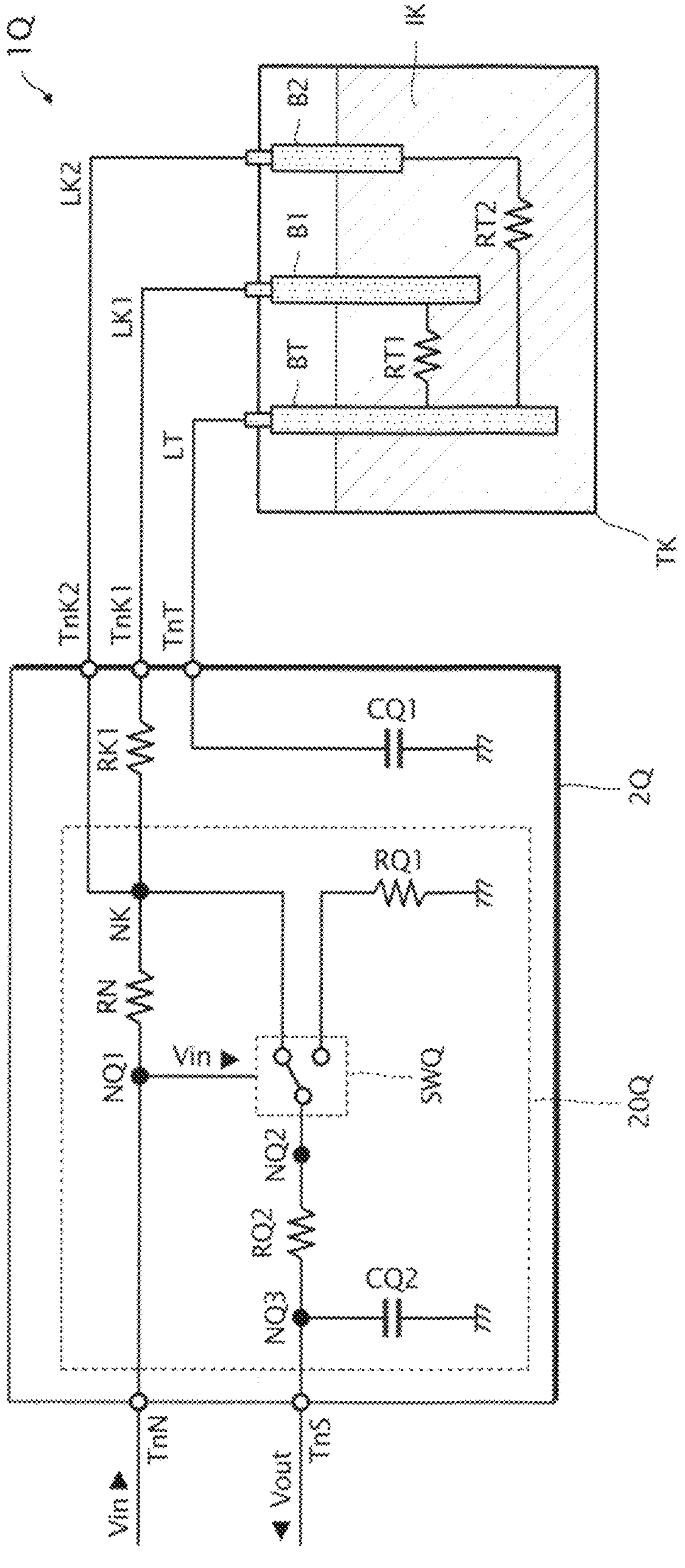
FIG. 24 is a circuit diagram showing an example of a configuration of an ink storage device 10 according to Modified Example 2.

FIG. 24 is a circuit diagram illustrating an example of a configuration of an ink storage device 10 provided to an inkjet printer according to Modified Example 2. Note that the inkjet printer according to Modified Example 2 is different from the inkjet printer 100 according to the first embodiment in that the ink storage device 10 is provided instead of the ink storage device 1A. Further, the ink storage device 10 is different from the ink storage device 1A according to the first embodiment in that an ink amount detection circuit 20 is provided instead of the ink amount detection circuit 2A.

As shown in FIG. 24, the ink amount detection circuit 20 includes the input terminal TnN, the detection terminal TnK1, the detection terminal Tnk2, the reference potential coupling terminal InT, the output terminal TnS, the resistor RK1, a capacitance CQ1, and an output circuit 200 including the node NK.

The input signal Vin is input to the input terminal TnN. The detection terminal TnK1 is electrically coupled to the electrode rod B1 via the detection wiring LK1. The detection terminal TnK2 is electrically coupled to the electrode rod B2 via the detection wiring LK2. The reference potential coupling terminal TnT is electrically coupled to the electrode rod BT via the reference potential coupling wiring LT. The output terminal TnS outputs the output signal Vout. One end of the resistor RK1 is electrically coupled to the node NK, and the other end thereof is electrically coupled to a node NQ1. In the capacitance CQ1, one of two electrodes provided to the capacitance CQ1 is electrically coupled to the reference potential coupling terminal TnT, and the other electrode is electrically coupled to wiring set to the ground potential.

The output circuit 200 includes the node NK, a node NQ1, a node NQ2, a node NQ3, the input resistor RN, a resistor RQ1, a resistor RQ2, a capacitance CQ2, and a switch SWQ.

The node NK is electrically coupled to one end of the resistor RK1, and is electrically coupled to one end of an input resistor RN, and is further electrically coupled to the detection terminal TnK2.

The node NQ1 is electrically coupled to the other end of the input resistor RN, is electrically coupled to the input terminal TnN, and is supplied with the input signal Vin via the input terminal TnN.

The switch SWQ has two input terminals, one output terminal, and one control terminal. Out of the two input terminals of the switch SWQ, one input terminal is electrically coupled to the node NK, and the other input terminal is electrically coupled to one end of the resistor RQ1. The output terminal of the switch SWQ is electrically coupled to the node NQ2. The input signal Vin is supplied to the control terminal provided to the switch SWQ via the node NQ1.

In the present modified example, the input signal Vin is a signal that is set to one of signal levels, namely a high level and a low level.

Further, in the present modified example, when the input signal Vin supplied to the switch SWQ is at the low level, the switch SWQ electrically couples the output terminal of the switch SWQ to one of the two input terminals of the switch SWQ. That is, in the present modified example, when the input signal Vin supplied to the switch SwQ is at the low level, the switch SWQ electrically couples the node NK and the node NQ2 to each other.

Further, in the present modified example, when the input signal Vin supplied to the switch SWQ is at the high level, the switch SWQ electrically couples the output terminal of the switch SWQ to the other of the two input terminals of the switch SWQ. That is, in the present modified example, when the input signal Vin supplied to the switch SWQ is at the high level, the switch SWQ electrically couples one end of the resistor RQ1 and the node NQ2 to each other.

One end of the resistor RQ1 is electrically coupled to the other input terminal of the two input terminals of the switch SWQ, and the other end is electrically coupled to the wiring set to the ground potential.

One end of the resistor RQ2 is electrically coupled to the node NQ2, and the other end thereof is electrically coupled to the node NQ3.

In the capacitance CQ2, one of the two electrodes provided to the capacitance CQ2 is electrically coupled to the node NQ3, and the other electrode is electrically coupled to the wiring set to the ground potential. The resistor RQ2 and the capacitance CQ2 function as a low-pass filter.

The output terminal TnS is electrically coupled to the node NQ3 and outputs the output signal Vout representing the potential of the node NQ3.

Figure 25:
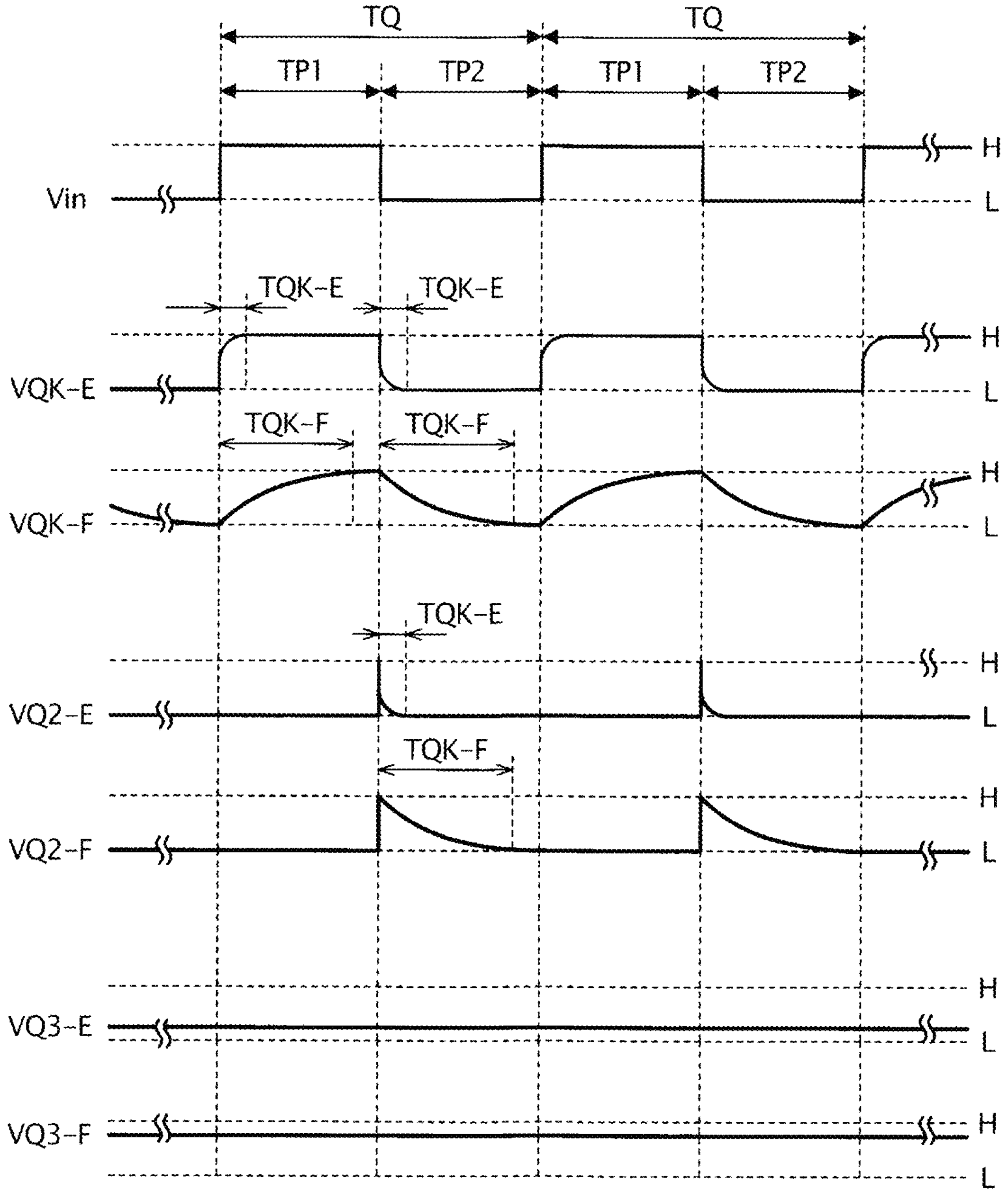
FIG. 25 is a timing chart showing an example of an operation of an ink amount detection circuit 20.

FIG. 25 is a timing chart illustrating various signals flowing through the ink amount detection circuit 20.

As illustrated in FIG. 25, in the present modified example, it is assumed when the operation period of the ink amount detection circuit 20 is divided into a plurality of unit periods TQ. In the present modified example, it is assumed when each unit period TQ is divided into a control period TP1 and a control period TP2.

The input signal Vin is set to the high level in the control period TP1 out of the unit periods TQ, and is set to the low level in the control period TP2 out of the unit periods TO.

The signal VQK is a signal representing the potential of the node NK. In the following description, the signal VQK when the ink IK stored in the ink tank TK is less than the remaining amount of ink corresponding to the distance H1, that is, when the ink IK in the ink tank TK is exhausted, is referred to as a signal VQK-E. Further, the signal VQK when an amount of the ink IK stored in the ink tank TK is equal to or larger than the ink amount corresponding to the distance H2, that is, when the ink IK in the ink tank TK is abundant, is referred to as a signal VQK-F.

When the ink IK in the ink tank TK is exhausted, the electrode rod BT and the electrode rod B1 are in the state of not being electrically coupled, and the electrode rod BT and the electrode rod B2 are in the state of not being electrically coupled. Therefore, the signal VQK-E exhibits a waveform having a shape interlocked with the input signal Vin. Specifically, the signal VQK-E rises from the low level to the high level after being delayed by the time TQK-E from the timing at which the input signal Vin rises from the low level to the high level, and falls from the high level to the low level after being delayed by the time TQK-E from the timing at which the input signal Vin falls from the high level to the low level. Here, the time TQK-E is a time shorter than the time length of the control period TP1 and shorter than the time length of the control period TP2, and is a time for charging a capacitance parasitic on the detection wiring LK1, the detection wiring LK2, the electrode rod B1, the electrode rod B2, and so on.

When the ink IK in the ink tank TK[m] is abundant, the electrode rod BT and the electrode rod B1 are in the state of being electrically coupled, and the electrode rod BT and the electrode rod B2 are in the state of being electrically coupled. For this reason, the signal VQK-F exhibits a waveform having a shape obtained by dulling the input signal Vin. Specifically, the signal VQK-F rises from the low level to the high level after being delayed by the time TQK-F from the timing at which the input signal Vin rises from the low level to the high level, and falls from the high level to the low level after being delayed by the time TQK-F from the timing at which the input signal Vin falls from the high level to the low level. Here, the time TQK-F is a time longer than the time TQK-E, and is a time for charging the capacitance parasitic on the reference potential coupling wiring LT, the electrode rod BT, and so on, and the capacitance CQ1 in addition to the capacitance parasitic on the detection wiring LK1, the detection wiring LK2, the electrode rod B1, the electrode rod B2, and so on.

The signal VQ2 is a signal representing the potential of the node NQ2. The signal VQ2 when the ink IK in the ink tank TK is exhausted and the ink liquid surface distance SZ in the ink tank TK is less than the distance H1 is hereinafter referred to as a signal VQ2-E. Further, the signal VQ2 when the ink IK in the ink tank TK is abundant and the ink liquid surface distance SZ in the ink tank TK is equal to or longer than the distance H2 is referred to as a signal VQ2-F.

As described above, in the control period TP1 in which the input signal Vin is at the high level, the switch SWQ electrically couples the node NQ2 and one end of the resistor RQ1 to each other. Therefore, in the control period TP1, the signal VQ2 is set to the low level.

Further, in the control period TP2 in which the input signal Vin is at the low level, the switch SWQ electrically couples the node NQ2 and the node NK to each other. Therefore, in the control period TP2, the signal VQ2-E exhibits a waveform having such a shape that the time TQK-E is required to fall from the high level to the low level. In addition, in the control period TP2, the signal VQ2-F exhibits a waveform having such a shape that the time TQK-F is required to fall from the high level to the low level.

The signal VQ3 is a signal representing the potential of the node NQ3. The signal VQ3 when the ink IK in the ink tank TK is exhausted and the ink liquid surface distance SZ in the ink tank TK is less than the distance H1 is hereinafter referred to as a signal VQ3-E. Further, the signal VQ3 when the ink IK in the ink tank TK is abundant and the ink liquid surface distance SZ in the ink tank TK is equal to or longer than the distance H2 is referred to as a signal VQ3-F.

As described above, the resistor RQ2 and the capacitance CQ2 function as the low-pass filter. Therefore, the signal VQ3 is a signal having a waveform obtained by removing a high-frequency component from the signal VQ2. As described above, the time TQK-F is longer than the time TQK-E. Therefore, the signal VQ3-F is higher in potential than the signal VQ3-E. That is, in the present modified example, when the ink IK in the ink tank TK is abundant and the ink liquid surface distance SZ is equal to or longer than the distance H2 in the ink tank TK, the ink amount detection circuit 20 outputs the output signal Vout higher in potential compared to when the ink IK in the ink tank TK is exhausted, and the ink liquid surface distance SZ is less than the distance H1 in the ink tank TK.

3.3. Modified Example 3

In the first embodiment, the second embodiment, Modified Example 1, and Modified Example 2 described above, the description is presented citing when the M ink amount detection circuits 2 corresponding one-to-one to the M ink tanks TK[1] to TK[M] are provided in the ink storage device 1 as an example, but the present disclosure is not limited to such an aspect. The ink storage device 1 may be provided with a smaller number of ink amount detection circuits 2 than M.

For example, the ink storage device 1 may be provided with a single ink amount detection circuit 2. In this case, for example, the ink amount detection circuit 2 may divide the operation period of the ink amount detection circuit 2 into M unit operation periods and detect the remaining amount of the ink IK stored in the ink tank TK[m] in the m-th unit operation period. Specifically, the ink amount detection circuit 2 may be configured to switch the ink tank TK[m] to which the ink amount detection circuit 2 is coupled for each unit operation period.

3.4. Modified Example 4

In the first embodiment, the second embodiment, and Modified Example 1 to Modified Example 3 described above, the electrode rod B1 may be configured without the coupling portion G1*t*. In this case, the electrode rod B1 may have a configuration in which the electrode forming portion G1 is coupled to the detection wiring LK1. The same applies to the electrode rod B2, the electrode rod B3, and the electrode rod BT.

3.5. Modified Example 5

In the first embodiment, the second embodiment, and Modified Example 1 to Modified Example 4 described above, a serial inkjet printer in which the housing case 921 on which the liquid ejection head HU is mounted is reciprocated in the main scanning direction MH1 is exemplified, but the present disclosure is not limited to such an aspect. The inkjet printer may be a line-type liquid ejection apparatus including a liquid ejecting head HU capable of ejecting the ink IK over the entire width of the medium PP.

3.6. Modified Example 6

The apparatus described liquid ejection exemplifying the inkjet printer in the first embodiment, the second embodiment, and Modified Example 1 to Modified Example 5 described above may be employed in various apparatuses such as a facsimile apparatus and a copier in addition to apparatuses dedicated to printing. However, the usage of the liquid ejection apparatus of the present disclosure is not limited to printing. For example, the liquid ejection apparatus for ejecting a solution of a coloring material is used as a manufacturing apparatus for forming a color filter of a liquid crystal display apparatus. Further, the liquid ejection apparatus that ejects a solution of a conductive material is used as a manufacturing apparatus that forms wiring and electrodes of a wiring board.

What is claimed is:

1. A liquid ejection apparatus comprising:

a storage container configured to store a liquid having conductivity;

a reference electrode housed in the storage container;

a first electrode housed in the storage container;

a second electrode housed in the storage container;

an output unit which is electrically coupled to the first electrode and the second electrode, and is configured to output an output signal corresponding to electric signals from the first electrode and the second electrode; and an identification unit configured to identify a remaining amount of the liquid stored in the storage container based on the output signal, wherein the first electrode has contact with the liquid stored in the storage container when the liquid equal to or more than a first amount is stored in the storage container, the second electrode has contact with the liquid stored in the storage container when the liquid equal to or more than a second amount larger than the first amount is stored in the storage container, the reference electrode has contact with the liquid stored in the storage container when the liquid equal to the first amount is stored in the storage container, and a resistance value of a first wiring path from the first electrode to the output unit is higher than resistance value of a second wiring path from the second electrode to the output unit.

2. The liquid ejection apparatus according to claim 1, wherein the first wiring path includes a resistive element.

3. The liquid ejection apparatus according to claim 2, wherein a resistance value of the resistive element is higher than a resistance value between the reference electrode and the first electrode.

4. The liquid ejection apparatus according to claim 1, wherein the storage container is replenished with the liquid, and the second amount is an amount based on a maximum storable amount of the liquid in the storage container.

5. The liquid ejection apparatus according to claim 1, wherein the first amount is an amount based on a minimum amount of the liquid in the container.

6. The liquid ejection apparatus according to claim 1, further comprising:

a third electrode housed in the storage container, wherein the output unit is electrically coupled to the third electrode, and is adopted to output an output signal corresponding to an electric signal from the third electrode, the third electrode has contact with the liquid stored in the storage container when the liquid equal to or more than a third amount larger than the first amount and smaller than the second amount is stored in the storage container, and a resistance value of a third wiring path from the third electrode to the output unit is lower than the resistance value of the first wiring path from the first electrode to the output unit and is higher than the resistance value of the second wiring path from the second electrode to the output unit.

7. A liquid storage device comprising:

a storage container configured to store a liquid having conductivity;

a reference electrode housed in the storage container;

a first electrode housed in the storage container;

a second electrode housed in the storage container; and an output unit which is electrically coupled to the first electrode and the second electrode, and is configured to output an output signal corresponding to electric signals from the first electrode and the second electrode, wherein the first electrode has contact with the liquid stored in the storage container when the liquid equal to or more than a first amount is stored in the storage container, the second electrode has contact with the liquid stored in the storage container when the liquid equal to or more than a second amount larger than the first amount is stored in the storage container, the reference electrode has contact with the liquid stored in the storage container when the liquid equal to the first amount is stored in the storage container, and a resistance value of a first wiring path from the first electrode to the output unit is higher than a resistance value of a second wiring path from the second electrode to the output unit.

8. The liquid storage device according to claim 7, wherein the first wiring path includes a resistive element.

9. The liquid storage device according to claim 8, wherein a resistance value of the resistive element is higher than a resistance value between the reference electrode and the first electrode.

10. The liquid storage device according to claim 7, wherein the storage container is replenished with the liquid, and the second amount is an amount based on a maximum storable amount of the liquid in the storage container.

11. The liquid storage device according to claim 7, wherein the first amount is an amount based on a minimum amount of the liquid in the container.

12. The liquid storage device according to claim 7, further comprising:

a third electrode housed in the storage container, wherein the output unit is electrically coupled to the third electrode, and is adopted to output an output signal corresponding to an electric signal from the third electrode, the third electrode has contact with the liquid stored in the storage container when the liquid equal to or more than a third amount larger than the first amount and smaller than the second amount is stored in the storage container, and a resistance value of a third wiring path from the third electrode to the output unit is lower than the resistance value of the first wiring path from the first electrode to the output unit and is higher than the resistance value of the second wiring path from the second electrode to the output unit.

* * * * *